(12) United States Patent
Pelenur et al.

(10) Patent No.: US 8,073,716 B2
(45) Date of Patent: Dec. 6, 2011

(54) METHODS FOR DIGITAL MANAGEMENT OF UNDERWRITING INSURANCE CONTRACTS

(75) Inventors: Julian E. Pelenur, Marblehead, MA (US); Paul Thomas Cummings, Westford, MA (US); Joseph Pilkerton, Charlestown, MA (US); John Belizaire, New York, NY (US); Kelly Ann Lynch, Glastonbury, CT (US); Jeffrey Jerome Glass, Arlington, MA (US); Hao Chen, West Hartford, CT (US); Thomas Albert Muldoon, Newburyport, MA (US)

(73) Assignee: FirstBest Systems, Inc., Lexington, MA (US)

( * ) Notice: Subject to any disclaimer, the term of this patent is extended or adjusted under 35 U.S.C. 154(b) by 685 days.

(21) Appl. No.: 12/167,589

(22) Filed: Jul. 3, 2008

(65) Prior Publication Data
US 2010/0004953 A1 Jan. 7, 2010

(51) Int. Cl.
*G06Q 40/00* (2006.01)
(52) U.S. Cl. .................................... 705/4; 705/7
(58) Field of Classification Search ............ 705/4
See application file for complete search history.

(56) References Cited

U.S. PATENT DOCUMENTS

| | | | |
|---|---|---|---|
| 6,856,980 B2 | 2/2005 | Feldman et al. | |
| 7,020,869 B2 | 3/2006 | Abrari et al. | |
| 7,152,053 B2 | 12/2006 | Serrano-Morales et al. | |
| 7,287,008 B1 | 10/2007 | Mahoney et al. | |
| 7,340,406 B1 * | 3/2008 | Tribble | 705/7.36 |
| 2002/0055862 A1 | 5/2002 | Jinks | |
| 2002/0111835 A1 * | 8/2002 | Hele et al. | 705/4 |
| 2002/0138307 A1 | 9/2002 | Kramer | |
| 2003/0187700 A1 * | 10/2003 | Bonissone et al. | 705/4 |
| 2003/0187701 A1 * | 10/2003 | Bonissone et al. | 705/4 |
| 2003/0187702 A1 * | 10/2003 | Bonissone et al. | 705/4 |
| 2003/0208385 A1 * | 11/2003 | Zander et al. | 705/4 |

(Continued)

FOREIGN PATENT DOCUMENTS
WO WO 96/13013 * 5/1996

OTHER PUBLICATIONS

Houser, Douglas G.; Arthur, Randy L. The Role of the Insurance Underwriter in Claims Disputes; 31 Tort & Ins. L.J. 608 (1995-1996).*

*Primary Examiner* — Charles Kyle
*Assistant Examiner* — Robert Niquette
(74) *Attorney, Agent, or Firm* — Lando & Anastasi, LLP

(57) ABSTRACT

Disclosed are methods of underwriting insurance contracts. In one embodiment a method comprises receiving from a registered user a request for approval of the insurance contract, the request for approval of the insurance contract including underwriting parameters of the insurance contract; reading, from a user database underwriting criteria corresponding to the user; determining whether the underwriting parameters of the insurance contract satisfy the underwriting criteria of the user; and providing an interface including a status message indicating that at least one underwriting criterion is not satisfied, if at least one underwriting criterion is not satisfied. The interface can include a graphical element linking a part of the status message with a displayed parameter of the contract. In another embodiment the method further comprises determining whether the underwriting parameters of the insurance contract satisfy underwriting criteria corresponding to a managing user with a greater scope of authority than the registered user.

60 Claims, 17 Drawing Sheets

U.S. PATENT DOCUMENTS

| | | | |
|---|---|---|---|
| 2004/0078243 A1* | 4/2004 | Fisher | 705/4 |
| 2004/0172311 A1* | 9/2004 | Kauderer et al. | 705/4 |
| 2004/0236611 A1* | 11/2004 | Bonissone et al. | 705/4 |
| 2005/0144047 A1* | 6/2005 | Tran et al. | 705/4 |
| 2005/0187799 A1 | 8/2005 | McGiffin et al. | |
| 2005/0187881 A1 | 8/2005 | McGiffin et al. | |
| 2006/0047540 A1 | 3/2006 | Hutten et al. | |
| 2007/0185743 A1 | 8/2007 | Jinks | |
| 2008/0091458 A1 | 4/2008 | Blackman et al. | |
| 2008/0103963 A1 | 5/2008 | Mahoney et al. | |

* cited by examiner

METHODS FOR DIGITAL MANAGEMENT OF UNDERWRITING INSURANCE CONTRACTS

BACKGROUND OF INVENTION

1. Field of Invention

This disclosure relates to the field of digital management of insurance underwriting, and more specifically to systems and methods for processing and managing requests for underwriting of insurance contracts.

2. Discussion of Related Art

Underwriting is the process that a financial services provider, such as an insurer, uses to assess the eligibility of a customer to receive a service, such as an insurance contract. Insurance underwriting is the detailed analysis preceding the binding of an insurance contract to determine how much coverage (if any) the customer should receive and at what premiums. The analysis may take into account a wide range of information concerning the customer's exposure to a wide variety of risks covered by the insurance. The underwriting process is crucial to an insurance provider's evaluation of whether taking on a particular risk—in exchange for collecting premium payments—will be profitable in the long run.

Typically an insurance underwriter is an individual who is given a letter of authority by his or her employer, an insurance carrier. The letter of authority defines the range of contract parameters for which the underwriter is authorized to quote or to bind the carrier to an insurance contract. For example, the underwriter may be permitted to offer property and casualty coverage on behalf of the carrier only up to a cap of $1M but not beyond. Or, the underwriter may be authorized to offer property and casualty coverage on behalf of the carrier to retail clothing businesses, but not to a construction business whose daily operations are considerably more hazardous.

An underwriter's letter of authority is typically a physical typed or printed paper letter setting forth the underwriting criteria that a case must meet for the underwriter to have binding authority. It is up to the underwriter to know the limits of his or her own authority as set forth in that letter, and to enforce those limits against the parameters of each submission they are given to underwrite. This process is error-prone, exposing carriers to risk and potential losses should an underwriter exceed his or her authority in binding an insurance contract.

SUMMARY OF INVENTION

Disclosed herein are systems and methods for digital management of underwriting authority. The systems described herein capture, in digital form, the criteria of each underwriter's letter of authority. The systems also allow the definition of software business rules that can be deployed to test the parameters of a submitted contract against the scope of the underwriter's authority, to determine automatically whether the underwriter has the authority to bind the contract. The systems described herein can also automatically refer rejected contracts to supervisory underwriters having higher authority.

According to one aspect, a system for processing and management of insurance contracts comprises a storage medium containing a user database, the user database comprising a plurality of user entries corresponding to a plurality of registered users, wherein each user entry includes a plurality of underwriting criteria. In this aspect the system also includes a processor having access to the user database, the processor configured to receive a request for approval of an insurance contract from an interface operated by one of the plurality of registered users, wherein the request for approval of the insurance contract includes a plurality of underwriting parameters of the insurance contract. In response to receiving the request for approval of the insurance contract, the processor determines whether the parameters of the insurance contract satisfy the underwriting criteria in a user entry corresponding to the one of the plurality of registered users, and, if at least one parameter of the insurance contract does not satisfy the underwriting criteria in the user entry corresponding to the one of the plurality of registered users, the processor provides to the interface a status message indicating that at least one underwriting criterion is not satisfied.

According to another aspect, the interface provided by the processor comprises a parameter display area for displaying the parameters of the insurance contract and a status display area for displaying the status message. The status display area can include an element corresponding to the at least one parameter of the insurance contract that does not satisfy the underwriting criteria in the user entry corresponding to the one of the plurality of registered users. That element can be a text box displaying text, an item in a list, or another display.

According to another aspect, the interface provided by the processor comprises a graphical element linking the element of the status display area with an element of the parameter display area corresponding to the parameter of the insurance contract that fails to meet the underwriting criteria. The shape of the graphical element may be computed based upon a size and location of the element in the status display area and the element in the parameter display area that are connected by the graphical element. The graphical element can be created in response to input from the one of the plurality of registered users, including selection of the element of the status display area, selection of the element of the parameter display area, or hovering a cursor over either element. The graphical element may also include an indicia of a reason for which the at least one parameter of the insurance contract does not satisfy the underwriting criteria in the user entry corresponding to the one of the plurality of registered users. The indicia may be a color or a texture.

According to another aspect, the user entry in the user database corresponding to the one of the plurality of registered users includes a user class. The underwriting criteria in the user entry may be selected, at least in part, from a set of underwriting criteria corresponding to the user class.

According to another aspect, the user entry in the user database corresponding to the one of the plurality of registered users includes an identification of a managing user. According to another aspect, if at least one parameter of the insurance contract does not satisfy the underwriting criteria in the user entry corresponding to the one of the plurality of registered users, the processor provides an underwriting failure message to the managing user (or to any other registered user or class of registered users). The underwriting failure message may identify the at least one parameter of the insurance contract that does not satisfy the underwriting criteria. The underwriting failure message may be provided by email. According to another aspect it may be provided to an interface operated by the managing user. The interface provided to the managing user may comprise a parameter display area for displaying the parameters of the insurance contract and a status display area for displaying the status message. The status display area can include an element corresponding to the at least one parameter of the insurance contract that does not satisfy the underwriting criteria in the user entry corresponding to the one of the plurality of registered users. That element can be a text box displaying text, an item in a list, or another display.

According to another aspect, the interface provided to the managing user comprises a graphical element linking the element of the status display area with an element of the parameter display area corresponding to the parameter of the insurance contract that fails to meet the underwriting criteria. The shape of the graphical element may be computed based upon a size and location of the element in the status display area and the element in the parameter display area that are connected by the graphical element. The graphical element can be created in response to input from the one of the plurality of registered users, including selection of the element of the status display area, selection of the element of the parameter display area, or hovering a cursor over either element. The graphical element may also include an indicia of a reason for which the at least one parameter of the insurance contract does not satisfy the underwriting criteria in the user entry corresponding to the one of the plurality of registered users. The indicia may be a color or a texture.

According to another aspect, the underwriting failure message may be provided to the managing user (or to any other registered user or class of users) either automatically or in response to an input from a registered user.

According to another aspect, the managing user is another of the plurality of registered users registered in the user database, and the processor determines whether the parameters of the insurance contract satisfy the underwriting criteria in a user entry corresponding to the managing user, and, if at least one parameter of the insurance contract does not satisfy the underwriting criteria in the user entry corresponding to the managing user, provides to the managing user a status message indicating that at least one underwriting criteria is not satisfied. According to still another aspect, the user entry corresponding to the managing user includes identification of a second managing user having a higher level of underwriting authority than the managing user. If the parameters of the insurance contract do not satisfy the underwriting criteria in the user entry corresponding to the managing user, the processor may provide an underwriting failure message to the second managing user. The underwriting failure message may be provided by email or provided to an interface operated by the second managing user.

According to another aspect, each of the underwriting criteria in the user entry corresponding to the one of the plurality of registered users is based upon one or more business rules. According to still another aspect, each of the underwriting parameters of the insurance contract is based upon one or more of the business rules. According to another aspect the processor may be configured to change the business rules in response to an input received from an interface operated by a registered user authorized to change business rules. The interface operated by the one of the plurality of registered users may include a web page provided by the processor, and wherein the web page includes a form generated by the processor based upon one or more of the business rules. The web page is generated dynamically by the processor in response to an input received from the interface operated by the one of the plurality of registered users. The form may include one or more of check boxes, text input, and numerical input. In some embodiments, the form may include at least one field that is displayed only if an entry in a previous field satisfies a predetermined criterion.

According to another aspect, the underwriting parameters of the insurance contract received by the processor are stored in a case entry in a case database. The case database is the same database as the user database, or it may be a distinct database from the user database. According to another aspect, the processor may be configured to permit the registered user and/or a second of the plurality of registered users to make at least one change to the case entry. Changes to the case entry may be made before the insurance contract is bound, after the insurance contract is bound but before the insurance contract is issued, and/or after the insurance contract is issued. Changes to the case entry may include a change to one of the underwriting parameters of the insurance contract and/or any annotation to the case entry.

According to another aspect, the processor can be configured to permit the case entry to be viewed by the registered user, the second registered user, and/or a third of the plurality of registered users via an interface operated by that user, the interface comprising a parameter display area for displaying the parameters of the insurance contract and a change display area for displaying the at least one change to the case entry. The change display area may include an element corresponding to the at least one change to the case entry made by the second of the plurality of registered users. That element can be a text box displaying text, an item in a list, or another display.

According to another aspect, the change to the case entry relates to a parameter of the insurance contract, and the interface further comprises a graphical element linking the element of the change display area with an element of the parameter display area corresponding to the parameter of the insurance contract to which the change relates. The shape of the graphical element may be computed based upon a size and location of the element in the change display area and the element in the parameter display area that are connected by the graphical element. The graphical element can be created in response to input from the one of the plurality of registered users, including selection of the element of the change display area, selection of the element of the parameter display area, or hovering a cursor over either element. The graphical element may also include an indicia of the nature of the change to the case entry and/or of the time at which the change to the case entry was made. The indicia may be a color or a texture.

According to another aspect, any interface provided by the processor includes data provided by the processor and viewed in a web browser. The data may include a Flash program.

According to another aspect, the processor may be adapted to generate data readable by a printer to generate a printed letter of authority for the one of the plurality of users.

According to still another aspect, a method of processing an underwriting insurance contract comprises receiving, from a terminal operated by a user registered in a user database comprising a plurality of user entries, a request for approval of the insurance contract, the request for approval of the insurance contract including a plurality of underwriting parameters of the insurance contract; reading, from a user entry in the user database corresponding to the registered user, a plurality of underwriting criteria corresponding to the registered user; determining whether the underwriting parameters of the insurance contract satisfy the underwriting criteria corresponding to the registered user; and providing, to the terminal, an interface including a status message indicating that at least one underwriting criterion is not satisfied, if at least one underwriting criterion is not satisfied.

According to another aspect, the interface provided by the processor comprises a parameter display area for displaying the parameters of the insurance contract and a status display area for displaying the status message. The status display area can include an element corresponding to the at least one parameter of the insurance contract that does not satisfy the underwriting criteria in the user entry corresponding to the one of the plurality of registered users. That element can be a text box displaying text, an item in a list, or another display.

According to another aspect, the interface provided by the processor comprises a graphical element linking the element of the status display area with an element of the parameter display area corresponding to the parameter of the insurance contract that fails to meet the underwriting criteria. The shape of the graphical element may be computed based upon a size and location of the element in the status display area and the element in the parameter display area that are connected by the graphical element. The graphical element can be created in response to input from the one of the plurality of registered users, including selection of the element of the status display area, selection of the element of the parameter display area, or hovering a cursor over either element. The graphical element may also include an indicia of a reason for which the at least one parameter of the insurance contract does not satisfy the underwriting criteria in the user entry corresponding to the one of the plurality of registered users. The indicia may be a color or a texture.

According to another aspect, the method includes providing an underwriting failure message to a managing user identified in the user entry corresponding to the registered user, if at least one parameter of the insurance contract does not satisfy the underwriting criteria in the user entry corresponding to the one of the plurality of registered users. The underwriting failure message may identify the at least one parameter of the insurance contract that does not satisfy the underwriting criteria. According to still another aspect, providing the underwriting failure message comprises providing the underwriting failure message to an interface operated by the managing user. The underwriting failure message may be provided to the managing user automatically or in response to an input from the registered user. The interface operated by the managing user may comprise a parameter display area for displaying the parameters of the insurance contract and a status display area for displaying the underwriting failure message. The status display area includes an element corresponding to the at least one parameter of the insurance contract that does not satisfy the underwriting criteria in the user entry corresponding to the one of the plurality of registered users. That element can be a text box displaying text, an item in a list, or another display.

According to another aspect, the interface provided by the processor comprises a graphical element linking the element of the status display area with an element of the parameter display area corresponding to the parameter of the insurance contract that fails to meet the underwriting criteria. The shape of the graphical element may be computed based upon a size and location of the element in the status display area and the element in the parameter display area that are connected by the graphical element. The graphical element can be created in response to input from the one of the managing user, including selection of the element of the status display area, selection of the element of the parameter display area, or hovering a cursor over either element. The graphical element may also include an indicia of a reason for which the at least one parameter of the insurance contract does not satisfy the underwriting criteria in the user entry corresponding to the one of the plurality of registered users. The indicia may be a color or a texture.

According to another aspect, the method further comprises reading, from a user entry in the user database corresponding to the managing user, a plurality of underwriting criteria corresponding to the managing user; determining whether the underwriting parameters of the insurance contract satisfy the underwriting criteria corresponding to the managing user; and providing a status message to the managing user indicating that at least one underwriting criterion corresponding to the managing user is not satisfied, if at least one underwriting criterion corresponding to the managing user is not satisfied.

According to another aspect, the method further comprises providing an underwriting failure message to a second managing user identified in the user entry corresponding to the managing user, the second managing user having a higher level of underwriting authority than the managing user, if the parameters of the insurance contract do not satisfy the underwriting criteria corresponding to the managing user. The underwriting failure message may be provided by email or to an interface operated by the second managing user.

According to another aspect, each of the underwriting criteria in the user entry corresponding to the one of the plurality of registered users is based upon one or more business rules. According to still another aspect, each of the underwriting parameters of the insurance contract is based upon one or more of the business rules. According to another aspect the processor may be configured to change the business rules in response to an input received from an interface operated by a registered user authorized to change business rules. The interface operated by the one of the plurality of registered users may include a web page provided by the processor, and wherein the web page includes a form generated by the processor based upon one or more of the business rules. The web page is generated dynamically by the processor in response to an input received from the interface operated by the one of the plurality of registered users. The form may include one or more of check boxes, text input, and numerical input. In some embodiments, the form may include at least one field that is displayed only if an entry in a previous field satisfies a predetermined criterion.

According to another aspect, the method comprises receiving, from the interface operated by the registered user, an instruction including a description of one or more of the business rules; and defining one or more of the business rules according to the received instruction.

According to another aspect, the method further comprises providing, to the interface operated by the registered user, a web page including a form for entering the underwriting parameters of the insurance contract, wherein the form is based upon the one or more business rules. Providing the web page may further comprise generating the web page dynamically in response to an input received from the interface operated by the registered user. The form may include one or more of check boxes, text input, and numerical input. The forum may also include at least one field that is displayed only if an entry in a previous field satisfies a predetermined criterion.

According to another aspect, the user entry in the user database corresponding to the registered user includes a user class of the registered user, and the method further comprises generating the interface operated by the registered user based, at least in part, upon the user class of the registered user.

According to another aspect, the method further comprises storing the plurality of underwriting parameters in a case entry in a case database. The case database may be implemented in the same database as the user database, or in a different one. According to another aspect, the method further comprises receiving, from an interface operated by the registered user and/or a second registered user in the user database, at least one change to the case entry. The change to the case entry may be received before the insurance contract is bound, after the insurance contract is bound but before the insurance contract is issued, and/or after the insurance contract is issued. Changes to the case entry may include a change to one of the underwriting parameters of the insurance contract and/or any annotation to the case entry.

According to another aspect, the method further comprises generating a user interface comprising a parameter display area for displaying the parameters of the insurance contract and a change display area for displaying the at least one change to the case entry made by the second registered user. According to another aspect, the interface may be displayed to the registered user, the second registered user, and/or a third of the plurality of registered users, the interface comprising a parameter display area for displaying the parameters of the insurance contract and a change display area for displaying the at least one change to the case entry. The change display area may include an element corresponding to the at least one change to the case entry made by the second of the plurality of registered users. That element can be a text box displaying text, an item in a list, or another display.

According to another aspect, the change to the case entry relates to a parameter of the insurance contract, and the method further comprises displaying a graphical element linking the element of the change display area with an element of the parameter display area corresponding to the parameter of the insurance contract to which the change relates. The shape of the graphical element may be computed based upon a size and location of the element in the change display area and the element in the parameter display area that are connected by the graphical element. The graphical element can be generated in response to input from the one of the plurality of registered users, including selection of the element of the change display area, selection of the element of the parameter display area, or hovering a cursor over either element. The graphical element may also include an indicia of the nature of the change to the case entry and/or of the time at which the change to the case entry was made. The indicia may be a color or a texture.

According to another aspect, the method comprises providing data readable by a printer to generate a printed letter of authority for the registered user.

According to another aspect, a system for processing and managing insurance contracts comprises a rules database comprising a plurality of business rules, each business rule specifying one or more conditions based upon one or more underwriting parameters; a user database comprising a plurality of user entries corresponding to a plurality of registered users; and a processor having access to the rules database and the user database. The processor is configured to provide to an interface operated by a registered user a form having a plurality of data fields generated based upon the underwriting parameters specified in at least a subset of the plurality of business rules; receive a plurality of inputted underwriting parameters corresponding to the data fields from the interface operated by the registered user; determine whether the inputted underwriting parameters satisfy the business rules; and if at least one of the inputted underwriting parameters does not satisfy the business rules, provide to the interface a status message indicating that at least one business rule is not satisfied. The status message may include an identification of the at least one business rule that is not satisfied.

According to another aspect, the interface comprises a form display area for displaying the data fields, and a status display area for displaying the status message. The status display area may include an element corresponding to the at least one business rule that is not satisfied by the inputted underwriting parameters. According to another aspect, the interface further comprises a graphical element linking the element of the status display area with an element of the form display area corresponding to an inputted underwriting parameter that does not satisfy the business rules. The graphical element can be created in response to input from the one of the plurality of registered users, including selection of the element of the status display area, selection of the element of the form display area, or hovering a cursor over either element. The graphical element may also include an indicia of a reason for which the input data element does not satisfy the business rules. The indicia may be a color or a texture. The graphical element may include a shape which is computed based upon a size and location of the element of the status display area and a size and location of the element of the form display area.

According to another aspect, the user entry corresponding to the registered user includes a user class, and wherein the form provided to the registered user is based at least in part upon the user class. According to another aspect, the determination of whether the inputted underwriting parameters satisfy the business rules depends, at least in part, upon the user class.

According to another aspect, the processor may be further configured to provide the status message to a second registered user, wherein the user entry corresponding to the second registered user includes a second user class, and wherein the second user class corresponds to a broader scope of user authority than the user class of the registered user. The processor may provide the status message to the second registered user automatically or in response to receiving an instruction from the registered user.

According to another aspect, the processor is configured to store the received plurality of inputted underwriting parameters, and to permit a second registered user to make at least one change to the stored plurality of inputted underwriting parameters. The change to the stored plurality of inputted underwriting parameters may comprise a change to one of the plurality of inputted underwriting parameters and/or an annotation to one of the plurality of inputted underwriting parameters. The processor is configured to permit the stored plurality of inputted underwriting parameters to be viewed by a third registered user via an interface operated by the third of registered user, the interface comprising a form display area for displaying the data fields and a change display area for displaying the at least one change to the stored plurality of inputted underwriting parameters made by the second of the plurality of registered users. Third registered user is a different user from the registered user, the second registered user, or both. According to another aspect, the change display area displayed to the third registered user includes an element corresponding to the at least one change to the stored plurality of inputted underwriting parameters made by the second registered user. The interface may comprise a graphical element linking the element of the change display area with an element of the form display area corresponding to the data field to which the change relates. The graphical element is created in response to input from the third registered user, including selection of the element of the status display area, selection of the element of the form display area, or hovering a cursor over either element. The graphical element may include an indicia of the nature of the change to the store data elements. The indicia may be a color or a texture. The graphical element may include a shape which is computed based upon a size and location of the element of the status display area and a size and location of the element of the form display area.

According to another aspect, the interface includes data provided by the processor and viewed in a web browser. The data may include a Flash program.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 13 is an embodiment of an interface for entering a user's underwriting criteria;

FIG. 14 is an embodiment of an interface for entering a user's underwriting criteria;

FIG. 16 is an embodiment of an interface for entering case parameters;

FIG. 17 is an embodiment of an interface for entering case parameters;

FIG. 19 is an embodiment of an interface for displaying changes to a case entry having a form display area and a change display area;

FIG. 20 is an embodiment of an interface for displaying changes to a case entry having a form display area and a change display area; and FIG. 21 is an embodiment of an interface for creating or changing business rules.

DETAILED DESCRIPTION

Figure 1:
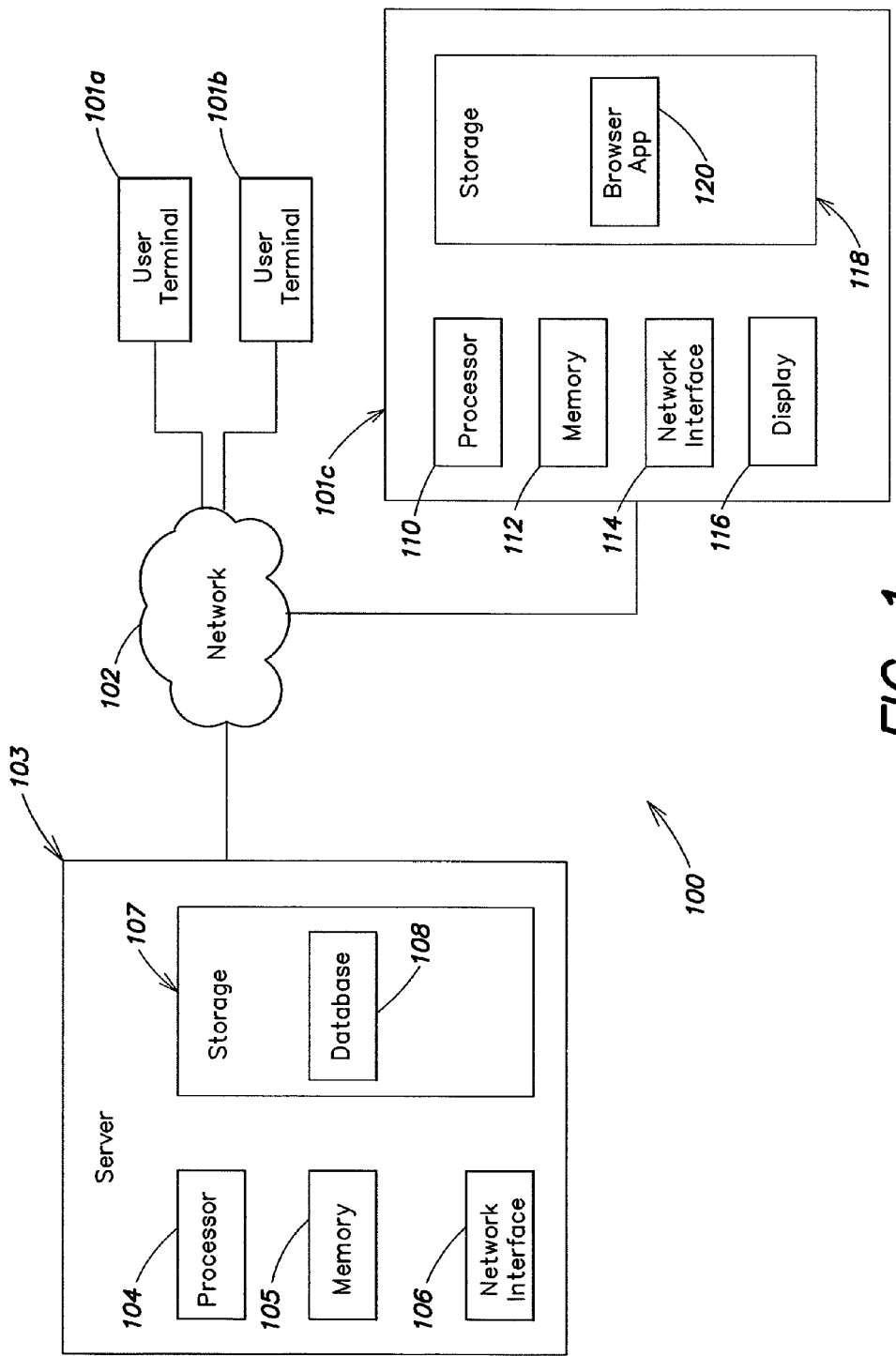
FIG. 1 is a block diagram of an example of a computer network on which the systems and methods described herein may be implemented.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

It should be appreciated that the various processes described herein may be implemented on appropriately programmed computer systems, e.g., general purpose computers, computing devices, and/or distributed networks. An example of a computer network for implementing the systems and methods described herein is illustrated in FIG. 1. FIG. 1 shows an example system 100 according to one embodiment of the invention upon which a system for automated processing and management of underwriting requests may be implemented. Users interact with server 103 via terminals 101 connected to server 103 via a communication network 102. Terminals 101 may be any type of computer system that is capable of sending, receiving, and displaying data. The terminals may be, for example, a general-purpose computer system (e.g., a personal computer (PC)) that connects to a communication network 102 (e.g., a local area network or the Internet). Other general purpose computer system types (e.g., a PDA, a cell phone, or other system type) may be used as terminals 101, via any sort of network 102. Typically terminals 101 include a processor 110 that retrieves and executes instructions stored in storage 118; memory 112; a network interface 114 for connecting to the communication network 102; and a display 116 for displaying an interface and/or data to a user. In a typical embodiment, storage 118 includes a browser application 120, such as a web browser, used to receive and display information on display 116 and receive and transmit information through network interface 114. While FIG. 1 illustrates three terminals 101, in practice any number of terminals may be connected to the server 103 via network 102.

Server 103 may also be a general-purpose computer system, or any other type of computer system capable of hosting a database and interacting with terminals 101 via a communications network. Server 103 generally includes one or more processors 104 for executing server-based functions including database functions. Server 103 also includes storage 107, such as a hard disk or multiple hard disks, which store database 108. Server 103 may also include a memory 105 for storing data associated with the operation of the server, including operation of the database. Server 103 may also include one or more network interfaces 106 that couple server 103 to network 102, which permit server 103 to communicate with the terminals 101. In one embodiment, server 103 provides web server content to the terminals 101.

While server 103 and terminals 101 are depicted in FIG. 1 as individual computing devices, it should be understand that any or all of them could be a distributed computing device, with functions divided among multiple processors 104 and 110, multiple storage units 107 and 118, multiple memories 105 and 112, etc.

Figure 2:
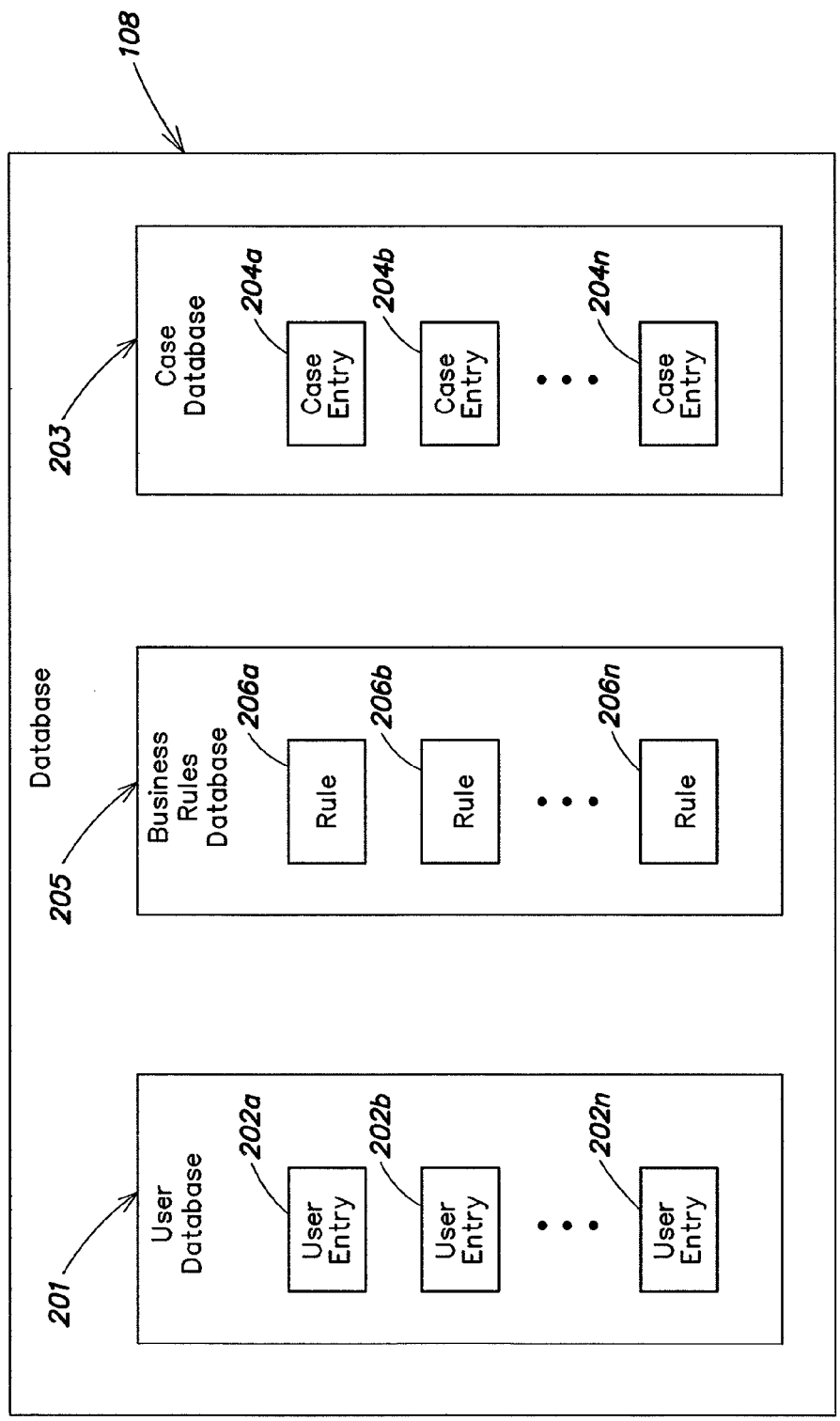
FIG. 2 is a block diagram of an embodiment of a database according to the present disclosure.

FIG. 2 illustrates schematically one embodiment of a structure of a database 108 implemented on server 103 for use by an insurance carrier as an underwriting management and processing system. According to one embodiment, database 108 includes user database 201, case database 203, and business rules database 205. User database 201 contains a number of user entries 202a . . . n corresponding to each of the users who are registered to use the underwriting management system. Case database 203 contains case entries 204a . . . n that correspond to insurance contracts whose parameters have been entered into the system. Business rules database 205 stores business rules 206a . . . n that are used to determine whether the parameters of an insurance contract satisfy the underwriting criteria of a user who has submitted an underwriting request for the contract. The number of user entries, business rules, and case entries need not be the same and can vary depending upon the specific needs of the organization for which the system is implemented. The contents of these databases are discussed in more detail below. The conceptual distinctions between user database 201, case database 203, and business rules database 205 are introduced here for clarity of discussion, but it should be appreciated that they may be implemented either as separate databases or as structures or classes of structures within a single database 108.

Figure 3:
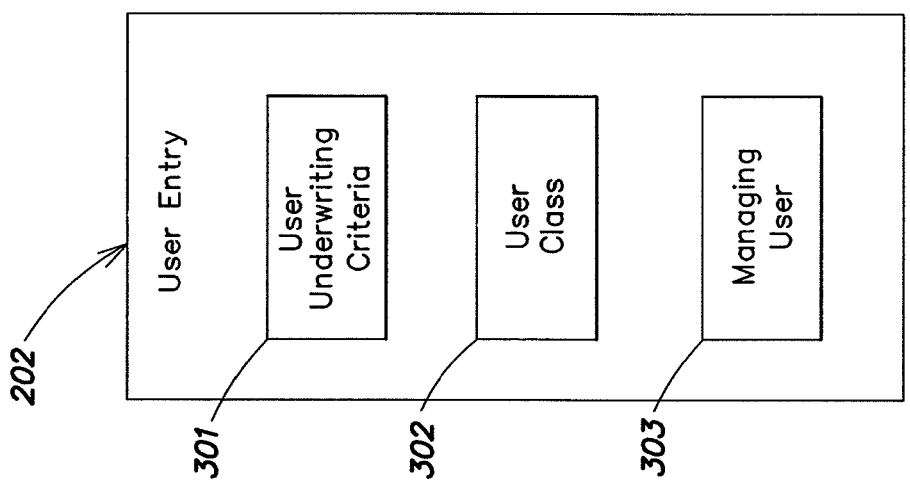
FIG. 3 is a block diagram of an embodiment of a user entry in a database.

FIG. 3 illustrates schematically an embodiment of a user entry 202 in a user database 201. User entry 202 is a database entry storing information about a particular registered user of the underwriting management system. Whenever a new user is registered to use the underwriting management system, a new user entry 202 is created corresponding to that user.

In addition to information identifying the user (such as name, address, access password, employee number, etc.) the user entry 202 contains the user's underwriting criteria 301. According to one embodiment, the user's underwriting criteria include parameters defining the scope of the user's authority to bind insurance contracts. For example, the user may be authorized to approve coverage only up to a particular monetary amount, only for certain classes of customers, only within certain geographic regions, or only for certain insurance plans offered by the carrier. Any such limits on the nature, type, or amount of coverage that the user is authorized to bind on the carrier's behalf may be stored in the user's underwriting criteria 301 in the user entry 202.

According to some embodiments, user entry 202 also contains a user class 302. Users may be classed according to their level of underwriting authority, level or supervising authority, relationship with the carrier, and/or other classes. For example, user classes may include a junior underwriter class having a relatively small scope of authority to bind the carrier to insurance contracts as well as managing underwriters with supervisory authority over one or more junior underwriters and a relatively greater scope of authority to bind the carrier. The database may also include non-underwriter user classes, such as an agent class, for third-party associates of the carrier who require access to the carrier's database of insurance contracts but may have a more limited scope of interaction with the database. In certain embodiments an agent class may be given a limited scope of underwriting authority defined in user underwriting criteria 301. Additionally, as will be discussed further below, the system can tailor the interfaces provided to the user according to the user's class, for example denying a class access to certain features, giving a class read-only access to certain database entries or granting a class full edit permissions to database entries, etc.

According to another embodiment, there is associated with a user class 302 a default set of user underwriting criteria 301 for that particular class. In such an embodiment, when a new user entry is created for a new registered user, the new registered user is assigned the default underwriting criteria for her selected user class. The underwriting criteria for the new registered user may then be customized by, for example, a managing user with authority to determine underwriting criteria for users belonging to the new registered user's class.

The user entry 202 may, in embodiments, also include the identification of a managing user 303. The managing user 303 may be a specific registered user or a class of users having a greater scope of authority than the registered user corresponding to the user entry 202. As will be discussed further below, the identification of the managing user 303 may be used by the system when referring a request for underwriting approval that exceeds the scope of authority of the registered user.

Figure 4:
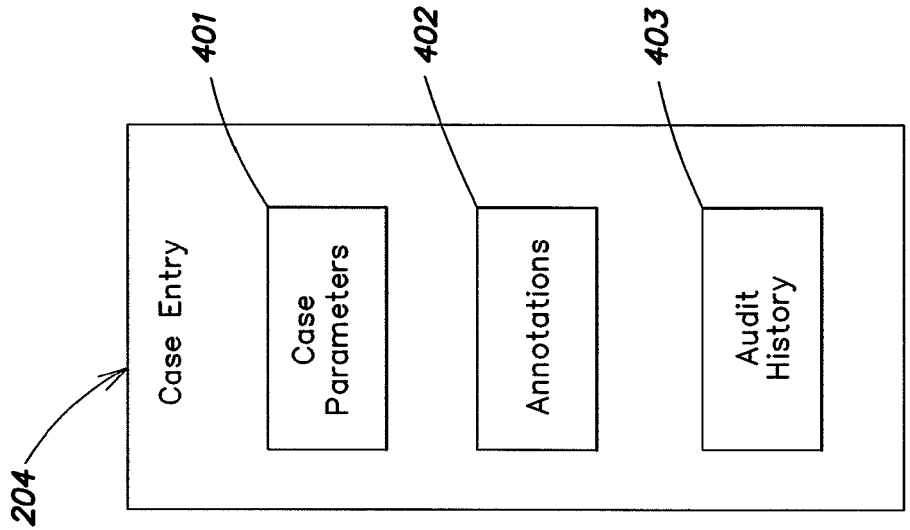
FIG. 4 is a block diagram of an embodiment of a case entry in a database.

FIG. 4 illustrates an embodiment of a case entry 204 in database 108. The case entry 204 is a database entry in which is stored the parameters defining the insurance contract for which approval is sought. Case parameters 401 typically encompass information of relevance to the underwriting analysis—information relating to the amount of risk the carrier would assume in issuing a policy to the customer. In addition to such identifying information as the name and address of the potential insurance customer corresponding to the case, case parameters 401 may include information about the nature of the customer's business, the amount of coverage sought, the amount of other insurance policies and/or debts held by the customer, etc.

When a new contract is submitted for approval, case entry 204 is created and case parameters 401 received and stored in case entry 204. Case entry 204 may also include annotations 402 added to the case entry 204 by a registered user either at the time of the case entry's creation or at some later time prior to or even after final approval and binding of the contract. As discussed further below, the annotations 402 may be linked to particular case parameters 401. The case entry 204, in embodiments, also includes an audit history 403 recording all changes and/or annotations made to the case entry 204 since its creation, along with the identities of the registered user who made them.

Database 108 may also include a business rules database 205 containing business rules 206. According to one embodiment, a business rule 206 is a conditional statement governing the decision process of the underwriting management system when a contract is submitted for approval. An example of a business rule 206 takes the form "IF condition X is true then return Y." X may generally represent complex compound statements that depend upon numerous conditions. Y generally may represent a simple action such as "deny coverage" or "take no action," or a more complex series of instructions.

For example, in a system programmed to deny insurance coverage in all instances to customers in the construction field, a business rule 206 may take them form "IF customer's business is construction THEN deny coverage." According to some embodiments, business rules 206 can also take into account the status of the registered user submitting a request. For example, if the carrier wishes to restrict its inexperienced underwriters from granting coverage to customers in the construction field, a business rule 206 may take the form "IF (user class is junior underwriter AND customer's business is construction) THEN deny coverage." Business rules 206 may also open additional areas of information gathering when certain conditions are met. For example, the carrier may wish its underwriting process to take into account information about the customer's existing liability insurance coverage when the customer is in the construction field, but to ignore such information when the customer is in another field. In such a case, business rule 206 may take the form "IF customer's business is construction THEN collect additional information." The utilization of business rules 206 by the underwriting management system is discussed in more detail below.

Figure 5:
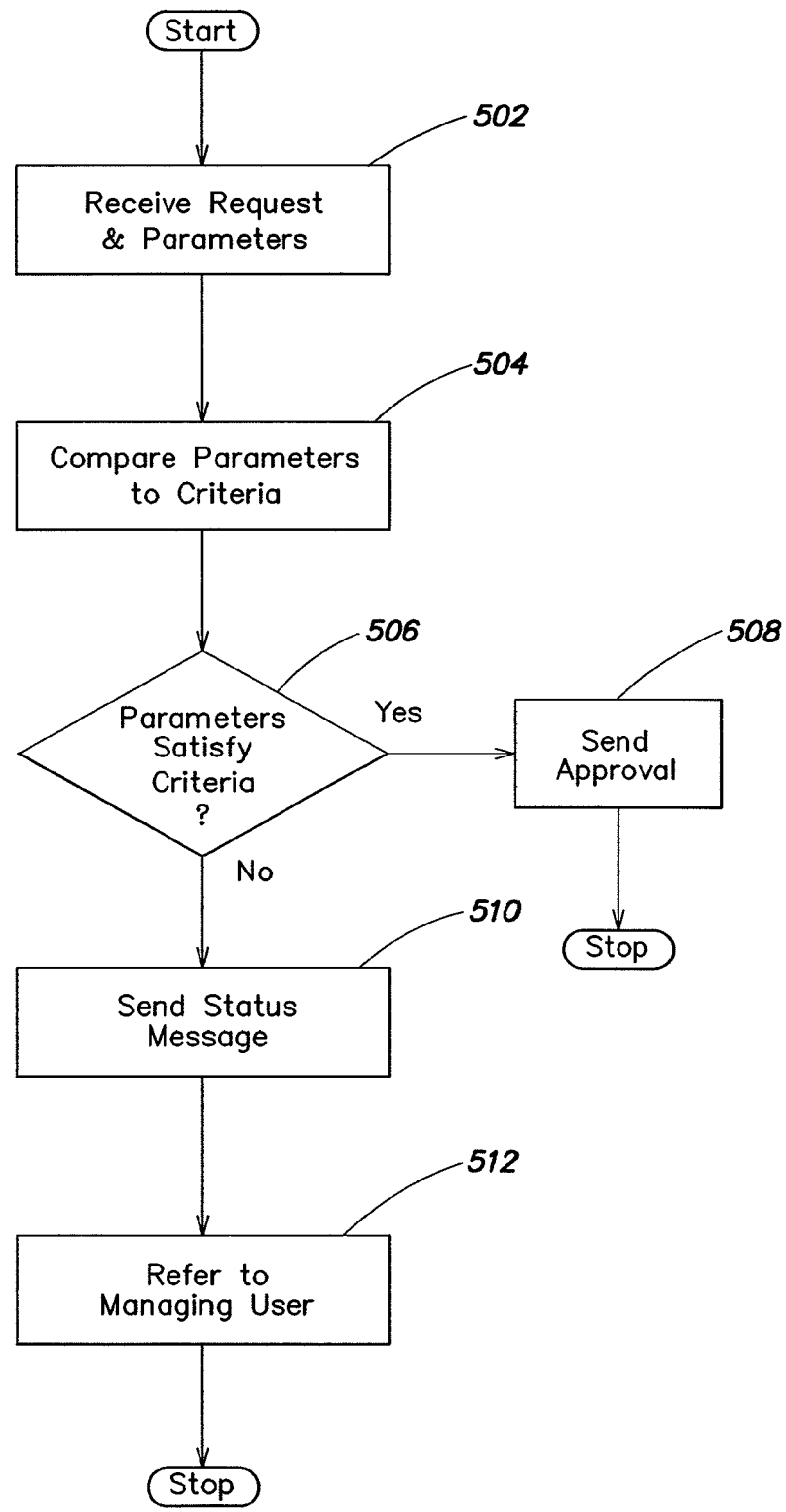
FIG. 5 is a flow chart of an example of a method for receiving and processing an underwriting request.

FIG. 5 is a flow chart of an example of an embodiment of a method of processing a request for underwriting approval of an insurance contract. At block 502, the underwriting management system receives from a registered user a request for underwriting approval of an insurance contract, including the case parameters associated with the contract. The system may save these case parameters into a new or existing case entry 204 in the case database 203 discussed above.

In block 504, the system retrieves the underwriting criteria that delineate the scope of the registered user's underwriting authority. According to one embodiment, the system accesses the user entry 202 in user database 201 that corresponds to the registered user submitting the request for underwriting approval. As discussed above user entry 202 contains user underwriting criteria 301 that the system will use to determine whether the contract should be approved. Having retrieved the user's underwriting criteria, the system then compares the parameters of the insurance contract with the underwriting criteria to determine whether the contract exceeds the registered user's scope of authority.

The comparison in block 504 of the contract parameters with the registered user's underwriting criteria is carried out via the business rules 206 stored in business rule database 205. According to one embodiment, the underwriting criteria 301 are implemented as instances of the business rules 206. (As noted previously, in such embodiments there may not be a clear distinction between business rule database 205 and user database 201.) The system steps through each business rule 206 that is applicable to the specific parameters of the insurance contract under evaluation.

If the outcome (block 506) of the application of all relevant business rules 206 to the contract parameters is positive then the system may send the registered user a message indicating that the contract is suitable for binding by that registered user (block 508). If any of the underwriting criteria of the registered user is not satisfied by the contract, however, the system sends a status message (block 510) indicating that the contract cannot be approved. For example, if the business rules 206 (or the user underwriting criteria 301) include a business rule of the form "IF requested coverage exceeds $X, THEN deny coverage," then a request for approval of a contract whose coverage amount exceeds the authority of the registered user would return a status message indicating denial of coverage. The status message may be sent immediately to the interface at the terminal 101 from which the registered user has submitted the request for approval. In embodiments, the status message is also sent to a managing user identified in the user entry 202 corresponding to the registered user, and/or any other users, or class of users, registered in the system. The status message may be sent as an electronic mail message to the managing user and/or other users. Alternatively, if the managing user is logged in to the system on a terminal 101, the status message may be sent immediately to any managing user's terminal, other user's terminal, or class of user's terminals as well. If any user receiving the status message is not logged in, the message may be stored by the system and displayed to that user upon login. The status message sent to the managing user may be identical to the status message sent to the registered user, or it may have different or additional information as desired.

In addition to sending a status message, upon a determination that any of the underwriting criteria of the registered user is not satisfied by the contract, in one embodiment of the system certain system functions may be disabled with respect to the registered user until the contract is approved (i.e., by a managing user to whom the contract is referred, as described below). For example, if all the underwriting criteria are satisfied, the system may present the registered user with an interface including an element (such as a button or a menu item) that the user can select to bind the carrier to the contract. If the underwriting criteria are not satisfied by the contract, however, the system may not present such an element, or present the element "greyed out," or otherwise present a message informing the user that the action of binding the contract is not available. If the contract is approved at a later time, the binding function may be re-enabled with respect to the registered user.

As noted above, the operation of some business rules 206 may be to request further information from the registered user. Thus, the operation of blocks 502-506 may, in some embodiments, be recursive. That is, if the application of a business rule 206 in block 506 results in a request for additional contract information to process, the system may return to block 502 and collect additional contract parameters from the registered user.

According to one embodiments, where the application of the business rules in blocks 504-506 results in a denial of coverage, the system may refer the request for approval to a managing user with a greater scope of underwriting authority than the registered user, such as a managing user identified in the user entry 202 corresponding to the registered user (block 512). As discussed further below, the system may complete a process similar to that of FIG. 5 to evaluate the contract parameters against the underwriting criteria of the managing user. In some embodiments, the referral of block 512 is initiated automatically. In other embodiments, the referral is initiated, either immediately or at a later time, in response to an input from the registered user or the managing user.

Figure 6:
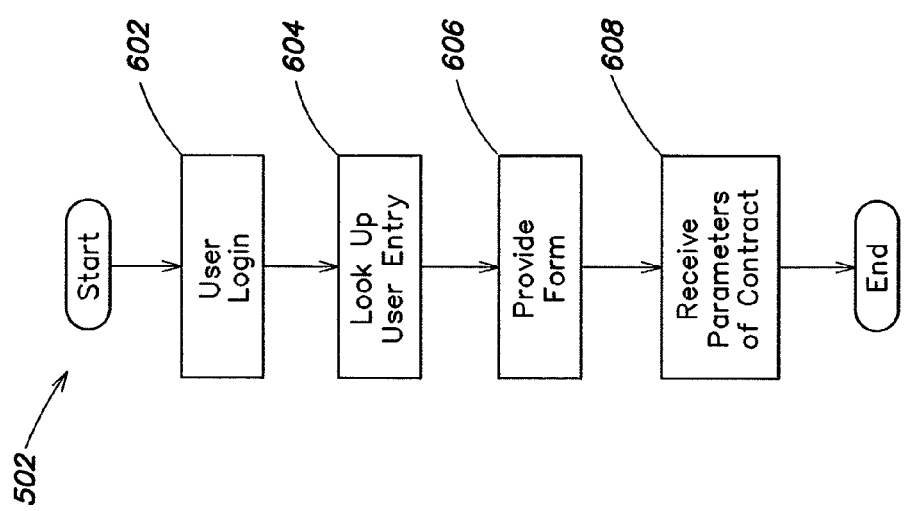
FIG. 6 is a flow chart of an example of a method for receiving the parameters of an insurance contract.

FIG. 6 illustrates a flow chart of an example of a process for receiving the request for underwriting approval of a contract corresponding to block 502 of FIG. 5. In block 602 of the process of FIG. 6, the registered user logs into the system and in block 604, the system accesses the user entry corresponding to the registered user. According to one embodiment, the user logs in via a client application (such as a web browser) operating on terminal 101 as shown in FIG. 1. The client application interacts with server 103 via network 102, and after the exchange of suitable security information (such as password, encryption key, etc.) the registered user's session is initiated.

In block 606, the system provides a form to the registered user by which the registered user may enter the parameters of the insurance contract for which approval is requested. According to one embodiment, this form is generated dynamically, with reference to the data in the user database 201 and/or the business rules database 205. For example, in order to determine what contract parameter information to request from the registered user, the system may consult the user underwriting criteria and/or the business rules that it will use (i.e. in blocks 504-506 of FIG. 5) to evaluate whether to give underwriting approval for the contract. It can then dynamically construct a form based upon the exact parameters that it will need to determine whether those underwriting criteria are satisfied.

Figure 12:
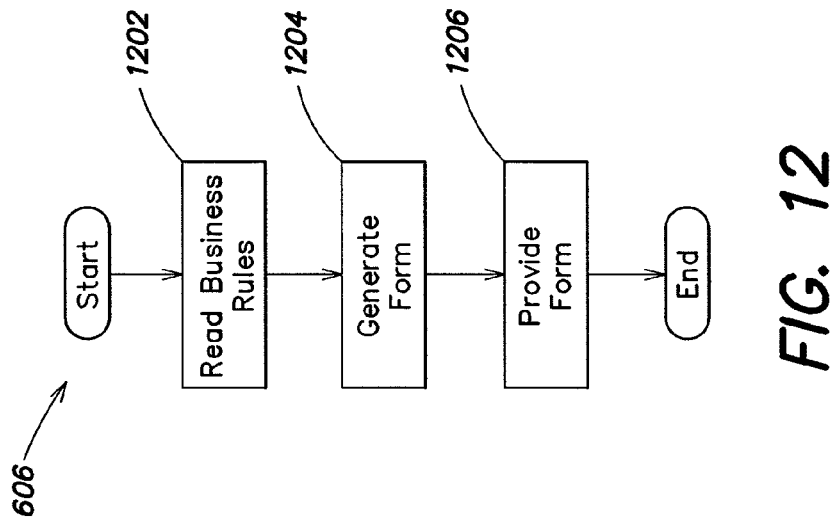
FIG. 12 is a flow chart of an example of a method for generating and providing a form for entry of case parameters.

An embodiment of a method of dynamically generating and providing a form is illustrated in FIG. 12. The process represented by the flow chart of FIG. 12 may be used, for example, in block 606 of FIG. 6. In FIG. 12, in block 1202 the system reads the relevant business rules from a database such as business rule database 205. The business rules are then used to generate a form for requesting input of the data necessary to evaluate the business rules (block 1204). For example, if the database contains a rule of the form "IF requested coverage exceeds $X, THEN deny coverage," the form generated by the system could include a field in which the requested coverage amount is entered. According to one embodiment, the form requests input via radio buttons, check boxes, text boxes, drop-down menus, and/or other input interface devices. By generating forms dynamically from the business rules that the system will evaluate, the system ensures that the forms collect exactly the right information that is needed to evaluate the business rules. In block 1206, the system provides the form to the user for data input. The form may be provided to an interface operated by the user on terminal 101, such as a web browser or other application adapted to display data received from a network and transmit data via a network.

An embodiment of an underwriting management system that generates forms dynamically (i.e. as illustrated in FIG.

12) is very flexible, as the business rules and/or underwriting criteria may be changed (by registered users authorized to do so) in accordance with the needs of the business, and the changes will be immediately and transparently reflected in the forms provided to registered users submitting contracts for approval, without the need to recompile the system, issue new paper letters of authority, or train users in new underwriting considerations. Thus, if the carrier elects to alter its underwriting practices by, for example, increasing the acceptable amount of debt that a customer may carry, the change in practice can be implemented immediately by changing the appropriate business rule 206 stored in the business rules database 205. Such changes may alternatively be implemented at the individual user level or at the user class level; for example, the carrier may elect to increase the maximum authorized coverage for an entire user class at once; again, such a change may be implemented instantly by altering a business rule stored in the database.

Returning to FIG. 6, the dynamically generated form provided in block 606 may, according to one embodiment, be provided by the server 103 to the client application running on the registered user's terminal 101. According to one embodiment, the client application is a web browser, and the form is implemented in, for example, the Adobe Flash programming environment. It will be recognized that any other suitable means of facilitating dynamic interaction between the user terminal 101 and the databases accessed by server 103 may be employed. According to one embodiment, the form requests input of contract parameters via radio buttons, check boxes, text boxes, drop-down menus, and/or other input interface devices.

In block 608, the system reads the parameters of the contract provided by the user via the form and stores them in the case database 203. According to one embodiment, the parameters of the insurance contract are provided in multiple forms; the system may base the sequence of forms upon the information collected in each round of form provided to the registered user. For example, a first form may request information regarding the field of operation of the customer, and subsequent forms may be tailored to request information specific to the field of operation entered in the first form.

Figure 7:
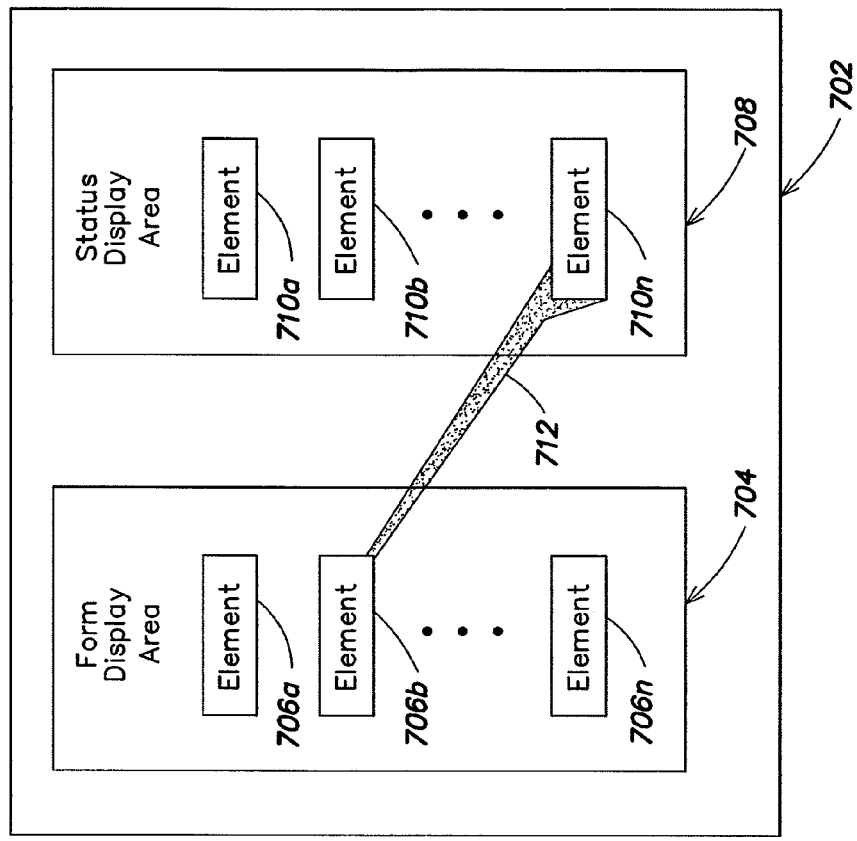
FIG. 7 is a diagram of an embodiment of a user interface showing a form display area and a status display area.

As noted above, in block 510 of the embodiment illustrated in FIG. 5, the system provides a status message to the registered user and/or a managing user when the parameters of the insurance contract fail to satisfy the registered user's underwriting criteria. According to one embodiment, the status message includes an indication of the reason or reasons for denial of coverage. For example, if the contract calls for an amount of coverage that exceeds the authority of the registered user, the status message will indicate this reason for denial of the request. According to one embodiment, the system provides the status message to the registered user in an interface on terminal 101. An embodiment of such an interface is illustrated in FIG. 7.

According to one embodiment, the interface 702 for displaying the status message includes a form display area 704 and a status display area 708. The form display area 704 includes elements 706 that display parameters of the insurance contract that were previously entered by the registered user and stored in the case entry 204 in the case database 203. The form display area may be, fore example, a window in an interface, a frame within a window in an interface, or any other area of an interface. The elements 706 may be radio buttons, check lists, text displays, or any other suitable devices for displaying the case parameters. Where the elements 706 are too numerous to display conveniently all at once, form display area 704 may include collapsible and expandable sub-areas, may be scrollable, or both.

According to one embodiment, the interface 702 for displaying the status message also includes a status display area 708 in which any elements 710 of the status message are displayed. The elements 710 of the status message include, for example, any reasons for rejection of the contract. According to one embodiment, the interface may be configured to provide a graphical element 712 that associates an element 710 of the status display area 708 with the element 706 of the form display area to which the element 710 of the status display area relates. For example, the graphical element 712 may visually connect an element 710 displaying a reason for rejecting the contract (i.e. "Amount of coverage requested exceeds user's underwriting authority") with an element 716 displaying the contract parameter that fails to meet the registered user's underwriting criteria (i.e., an element displaying the requested coverage amount). In this way the interface may guide the user quickly and visually to the particular contract parameters that exceed the registered user's authority, displaying the relevant parameters conveniently within the context of the entire form display.

The interface 702 may be provided to the registered user seeking underwriting approval immediately upon submission and processing of the request. Additionally, the interface 702 may be provided to a managing user (or any other user) either simultaneously or at a later time. Either way, in some embodiments the interface is configured to generate the graphical element 712 in response to an input from whatever user is viewing the interface on a terminal 101. Such input includes selection of an element 710 or element 706, such as clicking on an element 710 or an element 706 with a mouse or other input device (including tapping a touch screen), hovering a cursor over an element 710 or an element 706, or other input. If the elements 706 or 710 are too numerous to display conveniently all at once, the interface may be configured to automatically scroll and/or expand any collapsed sub-areas to display the relevant element 706 or 710 when the corresponding element 710 or 706 is selected by a user.

In some embodiments the graphical element 712 is a shaded and/or colored object having a size, shape, and/or position that are determined based upon the size, shape, and/or position of the elements 710 and 706 that it connects. The graphical element 712 may also indicate the nature of the reason for rejection of the contract by its color and/or its texture. For example, a red color may indicate a monetary value that exceeds authorized limits, a blue color may indicate a missing parameter or incomplete element in the form, etc. Alternatively textures such as dots, cross-hatching, or other patterns may be used to encode such information in the graphical element 712.

Figure 8:
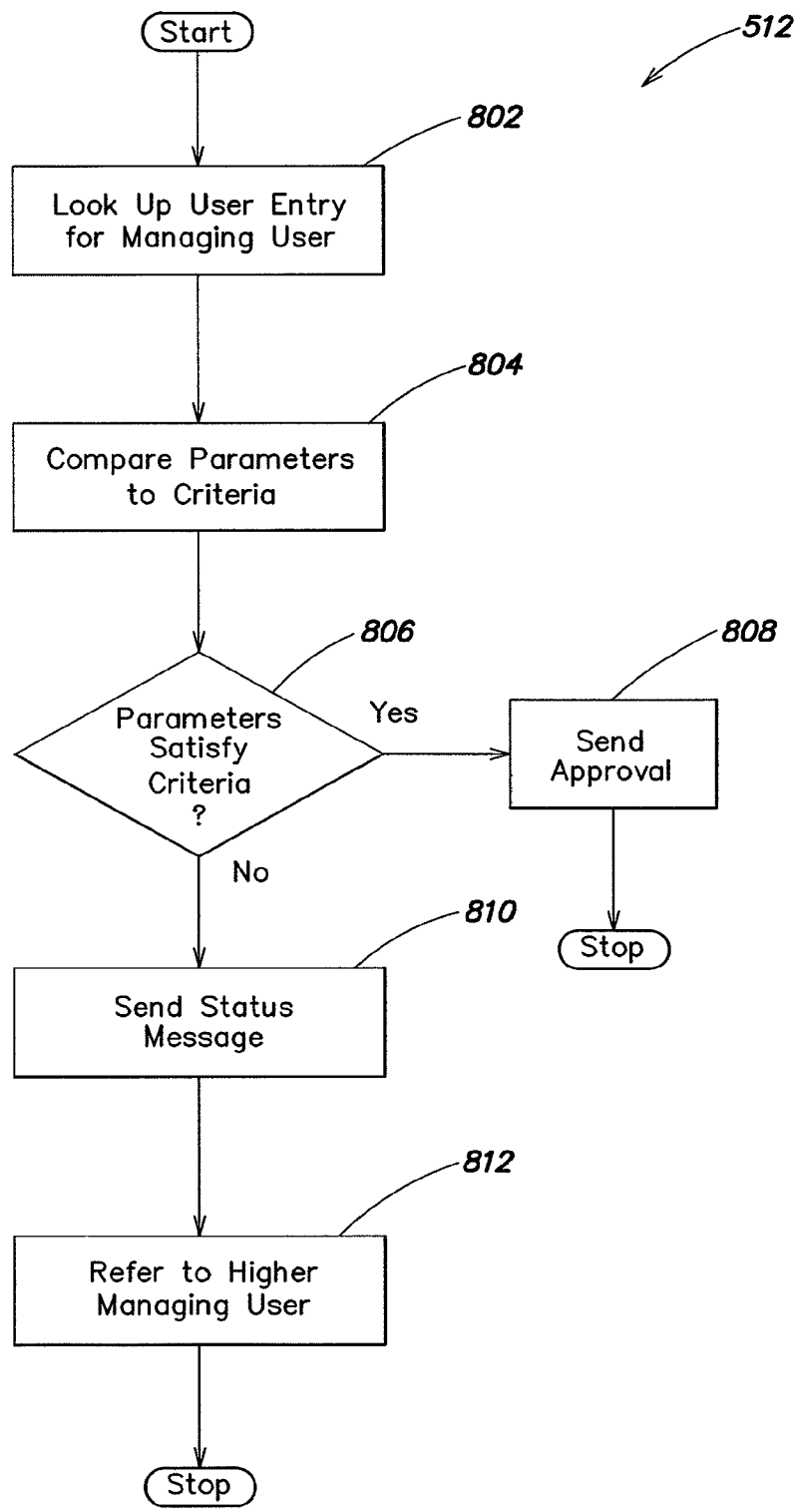
FIG. 8 is a flow chart of an example of a method for referring an underwriting request to a managing user.

As noted above, in block 512 of FIG. 5, according to one embodiment, the system refers a rejected underwriting request to a managing user with a greater scope of authority. This referral may happen either automatically or in response to an input from the registered user or the managing user (i.e., selecting a referral option presented with the status message in status display interface 710). FIG. 8 illustrates a flow chart for an example of a method of carrying out the referral, a process that is similar to the process shown in FIG. 5. At block 802, the underwriting management system retrieves the underwriting criteria that delineate the scope of the managing user's underwriting authority, i.e. by accessing the user entry 202 in user database 201 that corresponds to the managing user. Having retrieved the user's underwriting criteria, the system then compares the parameters of the insurance contract with the managing user's underwriting criteria to determine whether the contract exceeds the managing user's scope of authority (block 804). Again, this process is similar to the process of block 504 discussed above.

If the outcome (block 806) of the application of the comparison of the contract parameters with the managing user's underwriting criteria is positive, then the system may send the managing user a message indicating that the contract is suitable for binding by the managing user (block 808). If any of the underwriting criteria of the registered user is not satisfied by the contract, however, the system sends a status message (block 810) indicating that the contract cannot be approved. The status message is similar to the status message discussed above in connection with FIGS. 5 and 7. Just as with the previously discussed status message, the status message of block 810 may be sent immediately to the interface at a terminal 101 operated by the managing user has submitted the request for approval. In embodiments in which the referral process occurs automatically, the status message may be sent to the managing user by email and/or saved for later display upon the managing user's login.

According to one embodiment, the status message is also sent to a further managing user identified in the user entry 202 corresponding to the managing user and having a still broader scope of authority than the managing user. Additionally, where the application of the business rules in blocks 804-806 results in a denial of coverage, the system may refer the request for approval to the further managing user. This nested process in which rejected contracts are referred up the chain of authority may repeat as many times as there are levels of authority delineated among the users of the system. Once again, at each level, the referral of block 812 may be initiated automatically or in response to an input from the registered user or any managing user, either immediately or at a later time In some embodiments, it is desirable to permit registered users to annotate or change the case entry 204 corresponding to an insurance contract. Such annotations or changes may occur at any point after the case entry 204 is created—prior to approval of the contract, once the contract has been approved but prior to binding of the contract, once the contract has been bound but prior to issuance of a policy, or even after the contract has been bound and a policy issued. The annotations or changes may be made by the registered user who originated the case entry 204, by a managing user, or by any user with authority to alter existing case entries.

Figure 9:
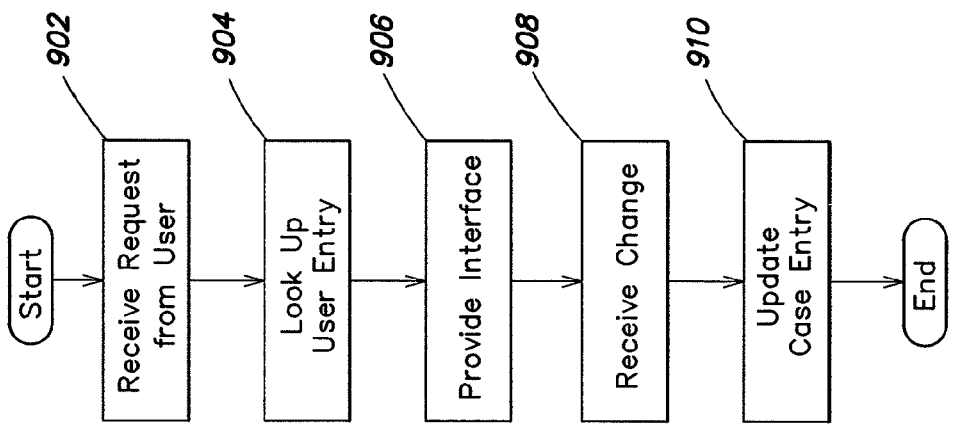
FIG. 9 is a flow chart of an example of a method for accepting a change to a case entry in a database.

FIG. 9 illustrates a flow chart of an example of a method for receiving changes to a case entry 204. (In this discussion, the word "change" means either a change to the case parameters 401 stored in case entry 204, or an annotation to a case entry, such as the addition of a comment or a question intended for another user to read.) In block 902, the system receives from a registered user (i.e., a user operating an interface on terminal 101) a request to edit a case entry 204. In block 904, the system retrieves the user entry 202 corresponding to the registered user.

In block 906, the system provides to the registered user via terminal 101 an interface in which the registered user can enter any changes to the case entry 204. The interface may be generated dynamically based upon the data in the case entry 204 and in the user entry 202 corresponding to the registered user. For example, the system may check data in the user entry 202 to determine whether the user has permission to change case parameters 401 of the particular contract the user is attempting to change. If the user lacks permission to change the case parameters 401, the interface provided would include input means for annotations only. The permissions granted to the registered user may be defined according to the user class 302 to which the registered user belongs. Alternatively they may be defined or customized on a user-by-user basis.

In block 908, the system receives any changes entered into the interface by the registered user, and in block 910 updates the case entry 204 to reflect these changes, altering the stored case parameters 401, annotations 402, and audit history 403 (discussed above in connection with FIG. 4) as required. Because the case entry 204 is updated immediately upon submission of changes, a user who subsequently requests and is granted access to the case entry 204 will be able to view the changes and the audit history of the contract.

Figure 10:
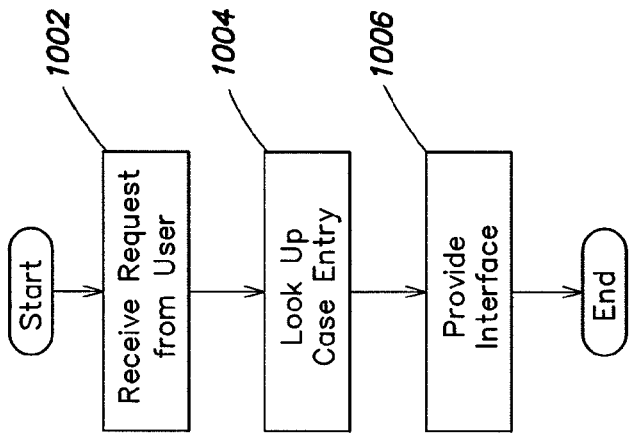
FIG. 10 is a flow chart of an example of a method for providing an interface showing a change to a case entry in a database.

FIG. 10 illustrates an example of a method for providing a display of a case entry 204 to which changes have been entered. In block 1002 a request to view a case entry is received from a registered user at a terminal 101, and in block 1004 the data in the case entry is retrieved. In block 1006, the system provides to the registered user at the terminal 101 an interface for viewing the case parameters stored in the case entry along with any changes that have been made to the case entry.

Figure 11:
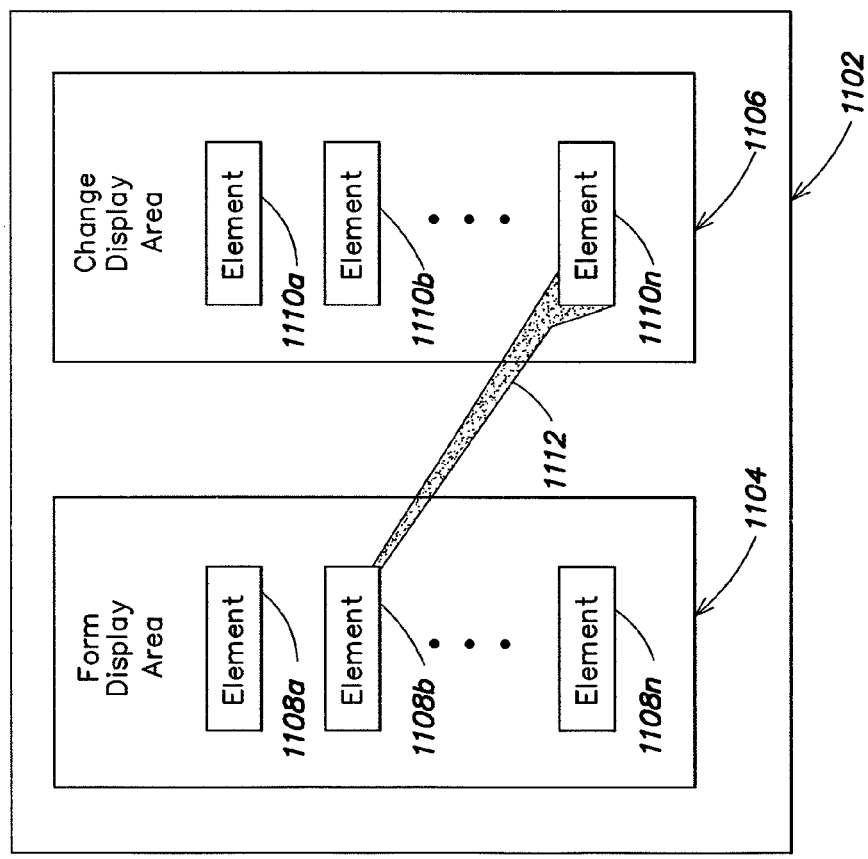
FIG. 11 is a diagram of an embodiment of an interface showing a form display area and a change display area.

FIG. 11 illustrates an example of an embodiment of an interface 1102 displaying case parameters and changes made to the case entry. The interface 1102 is similar to the example interface for displaying the status message, discussed above in connection with FIG. 7. The example interface 1102 for displaying the case entry and changes to the case entry includes a form display area 1104 and a change display area 1106. The form display area 1104 includes elements 1108 that display the parameters of the insurance contract. As in the interface illustrated in FIG. 7, the form display area 1104 may be, fore example, a window in an interface, a frame within a window in an interface, or any other area of an interface. The elements 1108 may be radio buttons, check lists, text displays, or any other suitable devices for displaying the case parameters. Where the elements 1108 are too numerous to display conveniently all at once, form display area 1104 may include collapsible and expandable sub-areas, may be scrollable, or both.

The example interface 1102 for displaying the case entry and changes to the case entry also includes a change display area 1106 in which any changes are displayed as elements 1110. The elements 1110 of the change display area may include any changes or annotations made by any registered user who previously made modifications to the case entry. According to one embodiment, changes to the case parameters 401 and annotations 402 to the case entry are presented together in the change display area 1106. Alternatively, changes and annotations may be displayed separately, either simultaneously in separate areas of the interface, or sequentially according to input by the user viewing the case entry.

Analogous to FIG. 7 discussed above, according to one embodiment, the interface 1102 may be configured to provide a graphical element 1112 that associates an element 1110 of the change display area 1106 with the element 1108 of the form display area 1104 to which the element 1110 of the change display area relates. For example, the graphical element 1112 may visually connect an element 1110 displaying a change made to the case entry (i.e. "user John Smith edited the customer address") with an element 1108 displaying the altered contract parameter (i.e., the customer address). In this way the interface may guide the user quickly and visually to the particular contract parameters that have been altered or annotated, displaying the relevant parameters conveniently within the context of the entire form display.

According to some embodiments, the interface is configured to generate the graphical element 1112 in response to an input from the user who is viewing the interface on a terminal 101. Such input includes selection of an element 1110 or element 1108, such as clicking on an element 1110 or an element 1108 with a mouse or other input device (including tapping a touch screen), hovering a cursor over an element 1110 or element 1108, or other input. If the elements 1108 or 1110 are too numerous to display conveniently all at once, the interface may be configured to automatically scroll and/or expand any collapsed sub-areas to display the relevant element 1108 or 1110 when the corresponding element 1108 or 1110 is selected by a user.

According to some embodiments, the graphical element 1112 is a shaded and/or colored object having a size, shape, and/or position that are determined based upon the size, shape, and/or position of the elements 1108 and 110 that it connects. The graphical element 1112 may also indicate the nature of the change or annotation it relates to. For example, a blue color may indicate a change made prior to binding of the contract, a yellow color a change made after binding but prior to issuance of a policy, and a red color a change made after the policy issues, etc. Alternatively, textures such as dots, cross-hatching, or other patterns may be used to encode such information in the graphical element 1112.

FIGS. 13-21 illustrate embodiments of various user interfaces adapted for use in an underwriting management system as described above.

Figure 13:
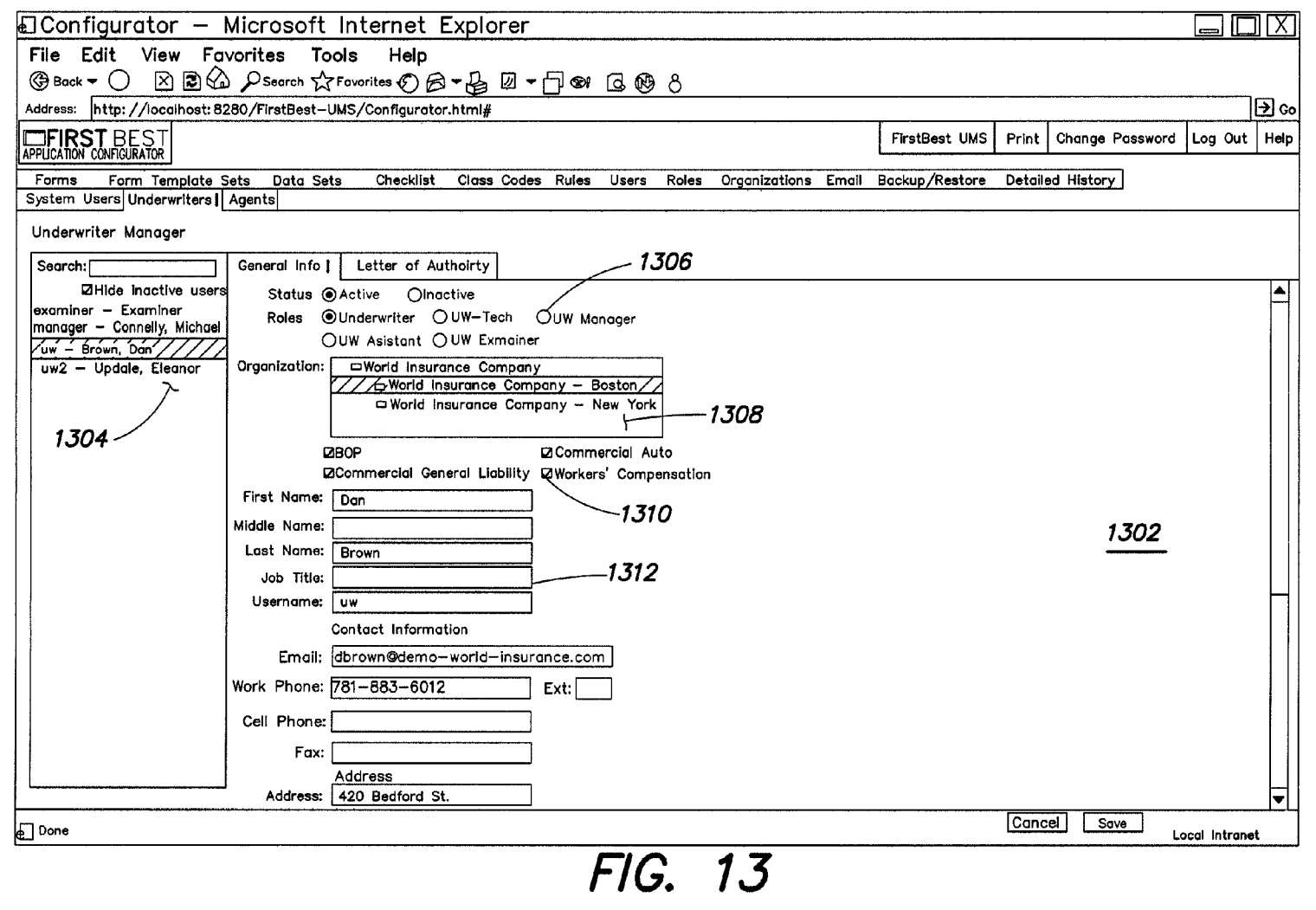

FIG. 13 illustrates an embodiment of an interface for entering data for a user entry 202 in a user database 201. The interface of FIG. 13 may be operated by a managing user or other user with authority to create and alter the user entry 202 corresponding to a particular user. The interface of FIG. 13, which is implemented in a web browser, includes a user selection area 1304 where the user whose data is being displayed is chosen, and a form area 1302 into which information about the user is entered. The form area 1302 includes several input devices including radio buttons 1306, drop-down picker 1308, check boxes 1310, and text boxes 1312. In this embodiment, the user is assigned to a user class using radio buttons 1306, and the types of insurance the user is authorized to underwrite are selected with check boxes 1310. Other fields collect other relevant information about the user, such as biographical and contact information.

Figure 14:
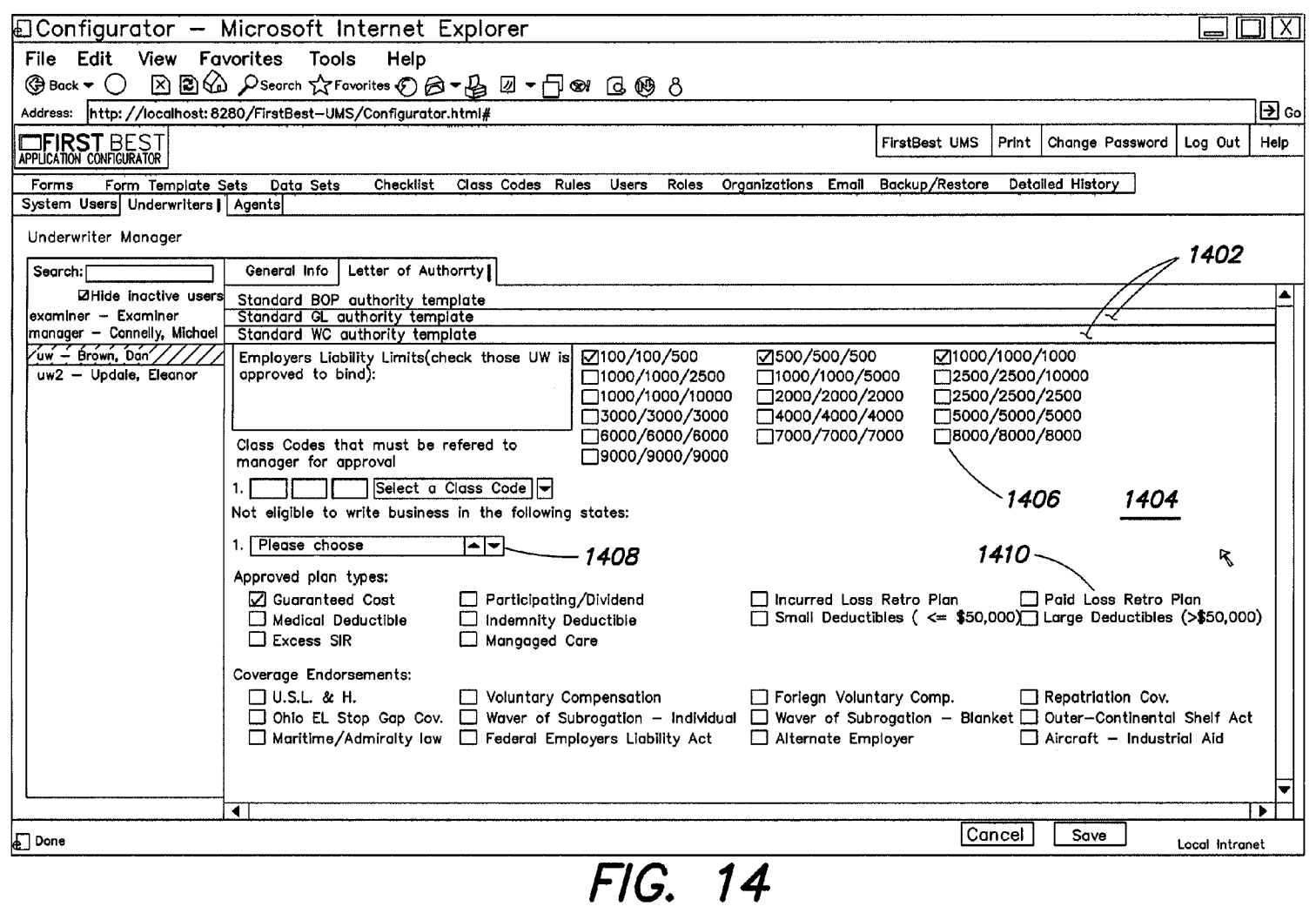

FIG. 14 illustrates an embodiment of another portion of an interface for entering data for a user entry 202 in a user database 201. The interface of FIG. 14, which is implemented in a web browser, includes regions 1402 of the user data entry form which have been collapsed for convenience of display; clicking on or selecting regions 1402 causes them to expand and display the form fields contained within as illustrated by expanded region 1404. In this example interface, expanded region 1404 includes check boxes 1406 to enter the limits of liability that the user approved to bind; a drop-down menu 1408 for selecting geographical limitations on the user's underwriting authority; and check boxes 1410 for indicating the types of insurance products that the user is authorized to bind on the carrier's behalf.

Figure 15:
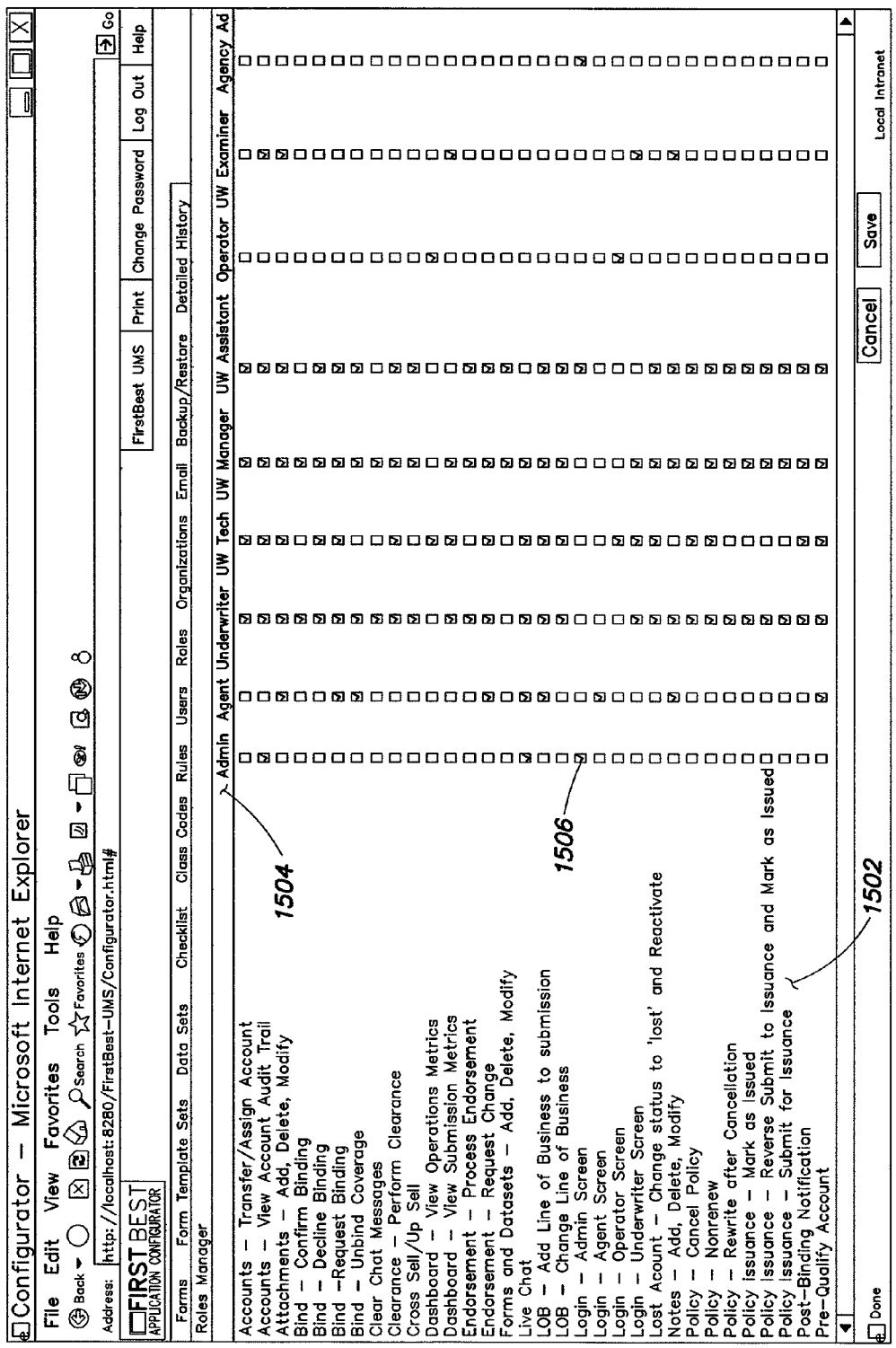
FIG. 15 is an embodiment of an interface for defining user classes.

FIG. 15 illustrates an embodiment of an interface for defining user classes. The interface of FIG. 15 may be operated by a managing user or other user with authority to create and alter the definitions of user classes. The interface of FIG. 15, which is implemented in a web browser, includes a list of tasks 1502 which user classes may be granted permission to perform. It also includes a list 1504 of all possible user classes. The interface also includes a matrix of checkboxes 1506 which may be selected to give the user class 1504 at the top of a checkbox's column the permission to perform the task 1502 identified to the left of the checkbox's row.

Figure 16:
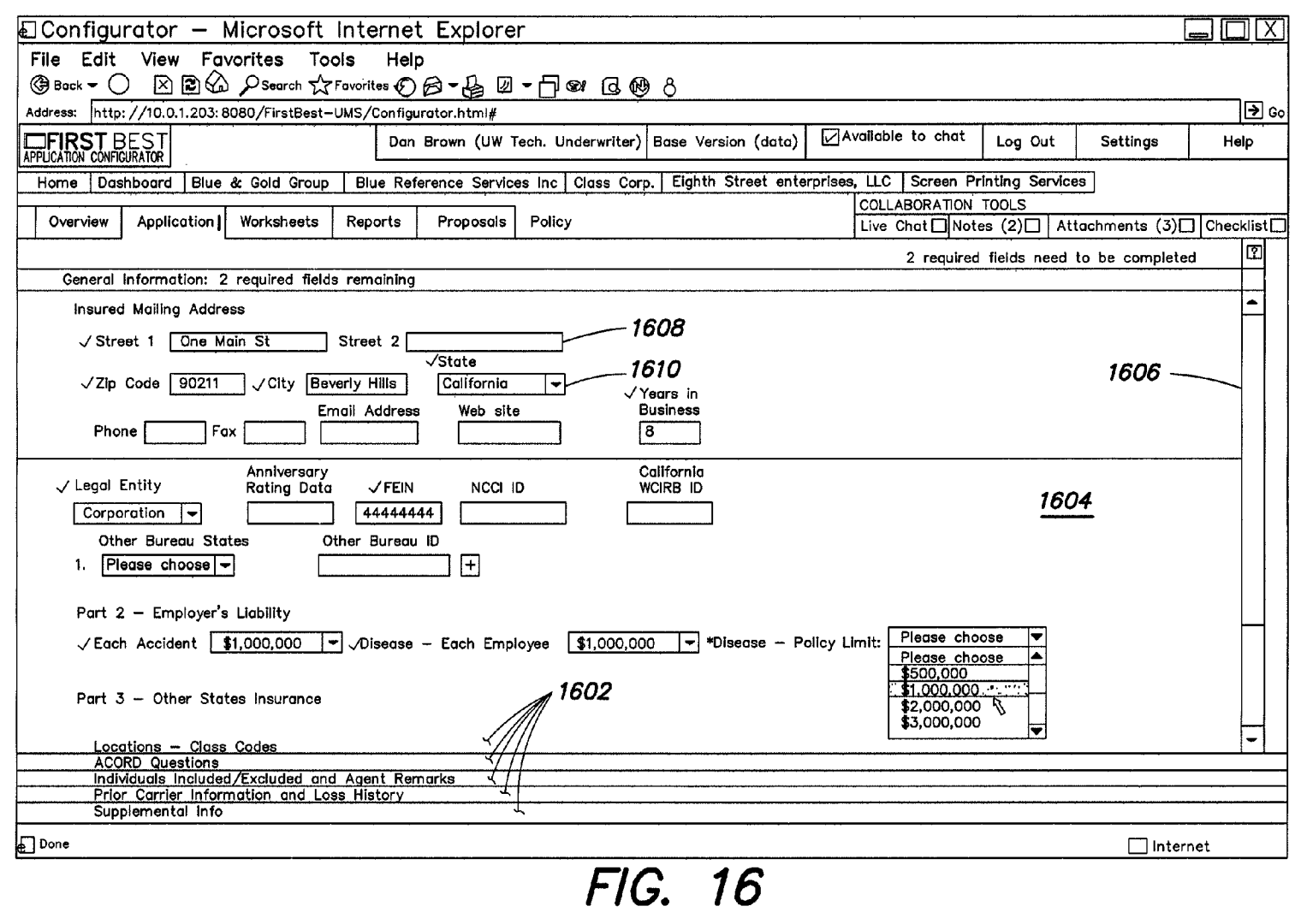
Figure 17:
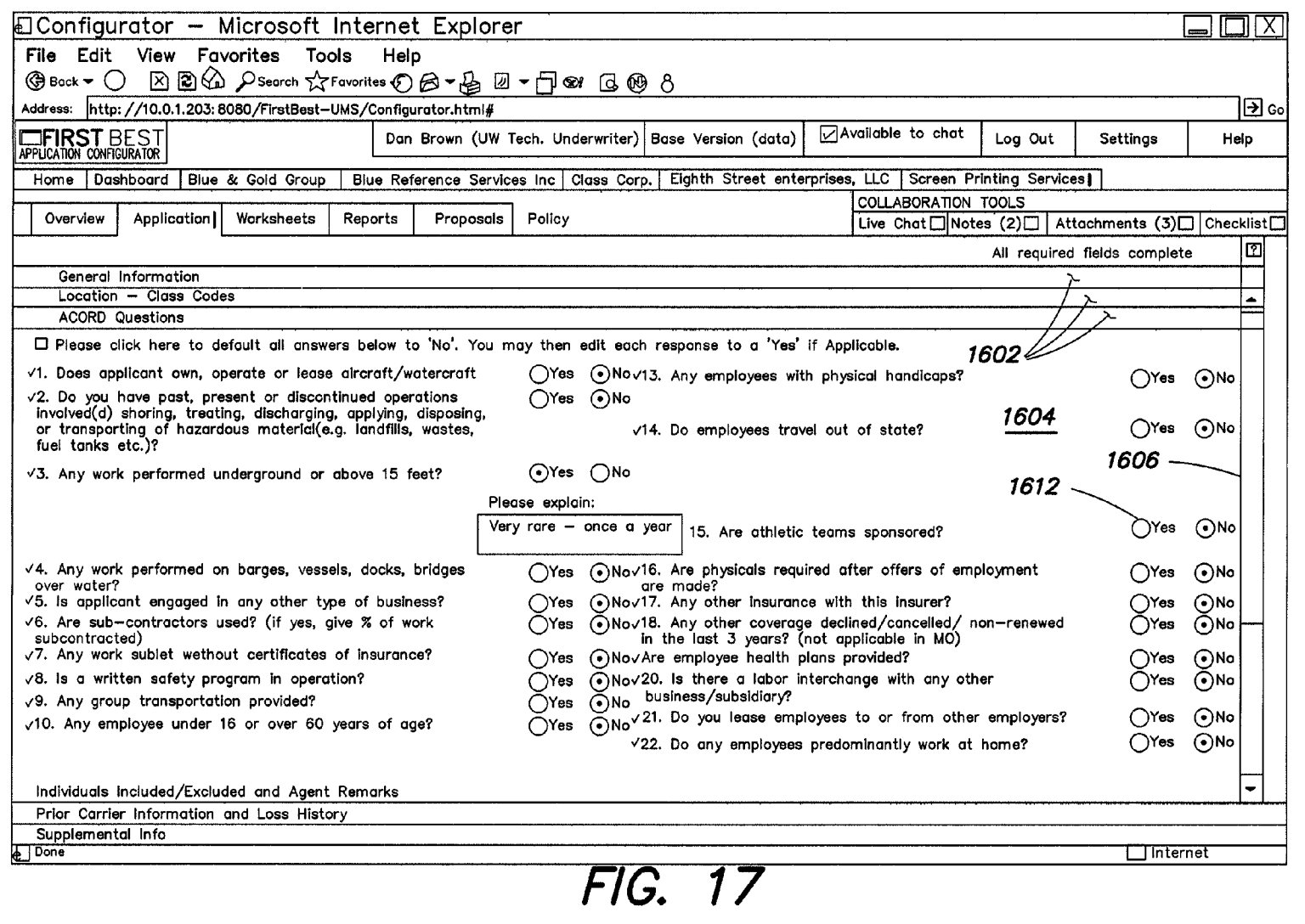

FIGS. 16 and 17 illustrate an embodiment of an interface for entering data for a case entry 204 in a case database 203. The interface of FIGS. 16 and 17, which is implemented in a web browser, includes regions 1602 of a case data entry form which have been collapsed for convenience of display; clicking on or selecting regions 1602 causes them to expand and display the form fields contained within as illustrated by expanded region 1604. Expanded region 1604 may be scrolled for convenient viewing using scroll bar 1606. In this example interface, expanded region 1604 includes text boxes 1608 and drop down menus 1610 for entering biographical and other information about the customer as well as radio buttons 1612 for answering questions about the risks of operation of the customer's business.

Figure 18:
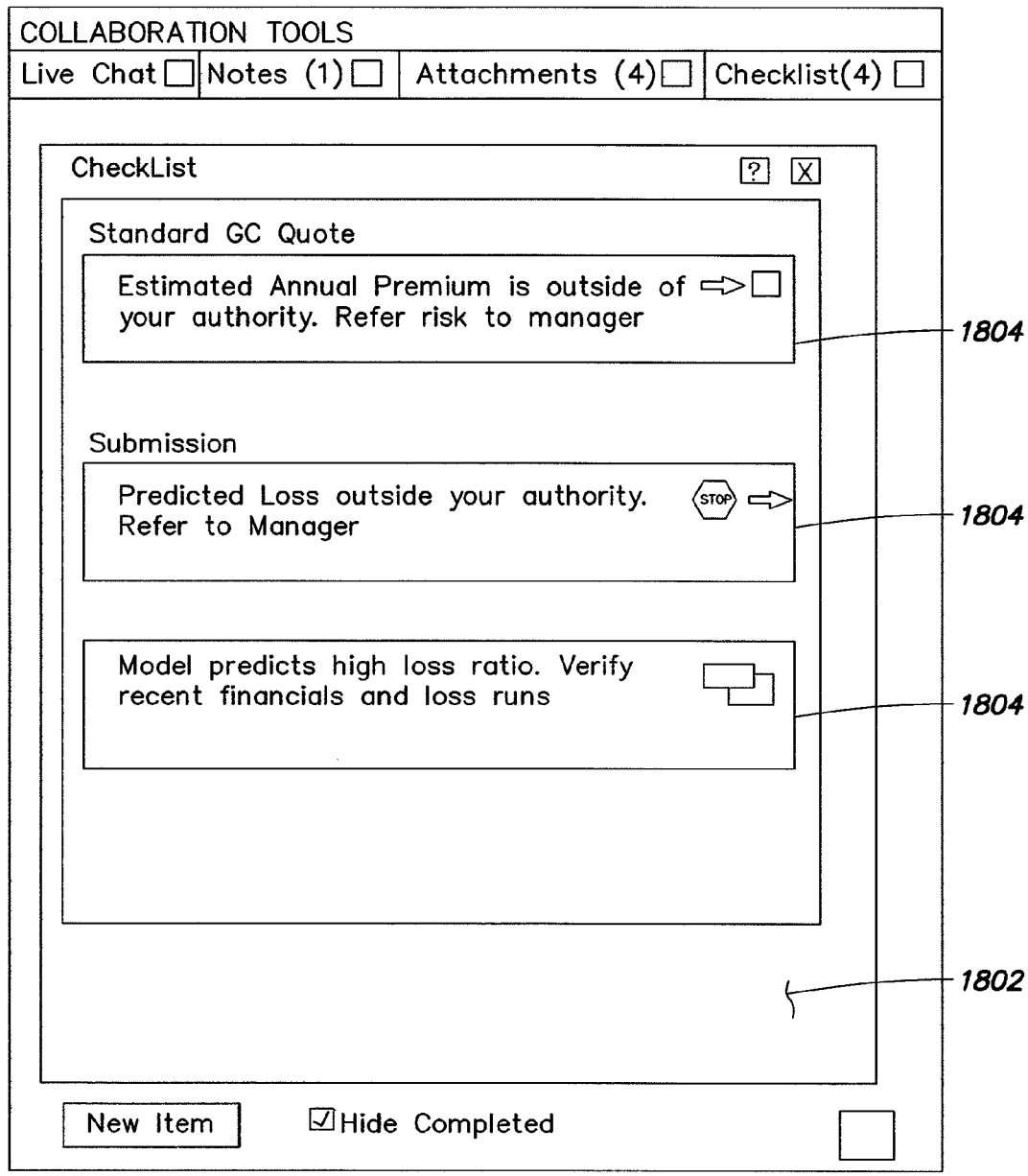
FIG. 18 is an embodiment of an interface for displaying an underwriting status message.

FIG. 18 illustrates an embodiment of a display of a status message provided to a user when a request for approval of an insurance contract is denied by the system. The display 1802 of FIG. 18 may correspond, for example, to the status display area 708 of FIG. 7, and the status indicators 1804 to the elements 710 of status display area 708. In the embodiment illustrated in FIG. 18, the indicators 1804 display the reasons why the contract was not approved, indicating which contract parameters fail to satisfy the user's underwriting criteria. The indicators 1804 may also indicate that referral to a managing user is required to secure approval of the contract. According to one embodiment, indicators 1804 may be (or include) buttons that when selected by the user viewing display 1802 will initiate the referral process discussed above in connection with FIG. 8.

Figure 19:
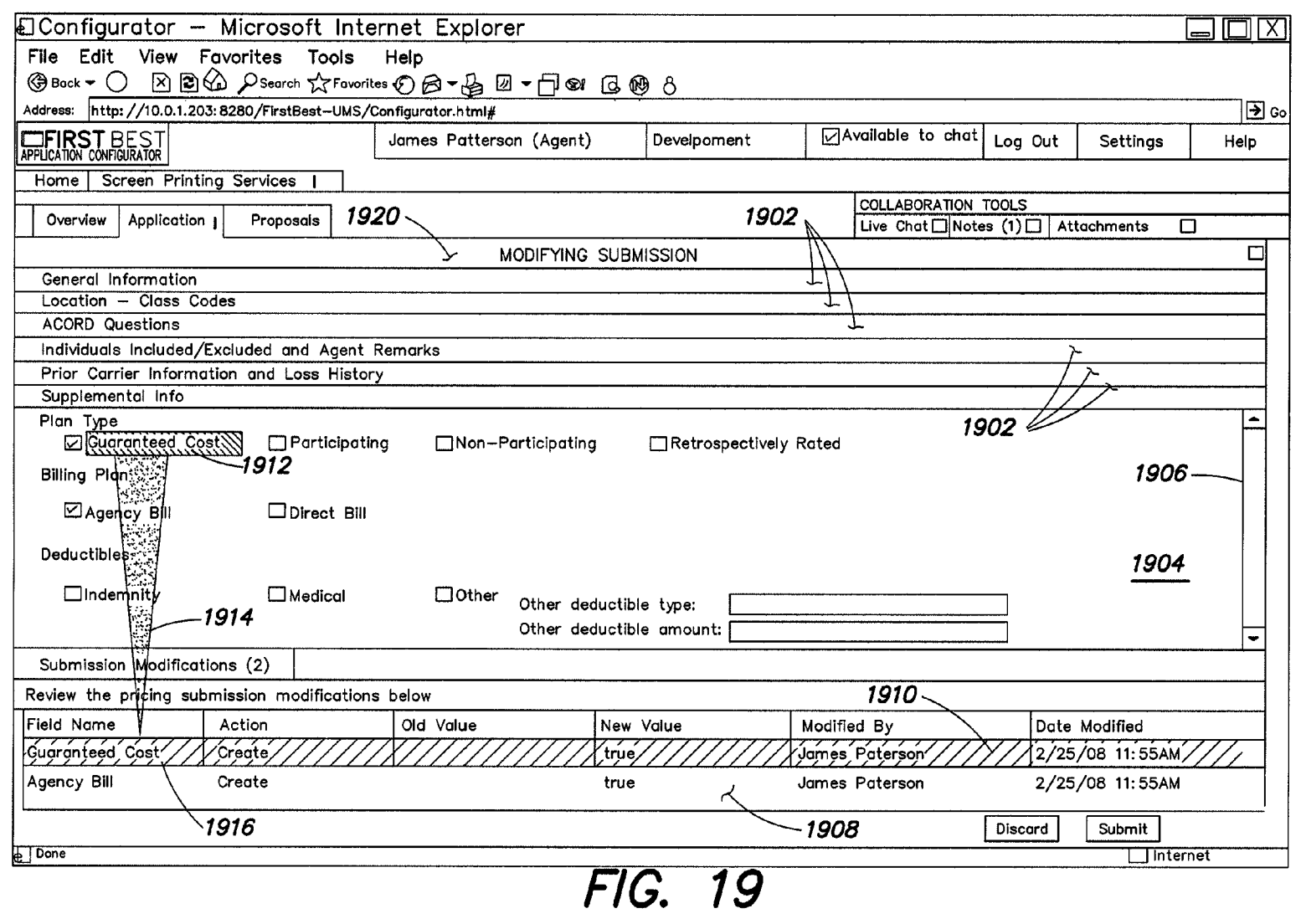

FIG. 19 illustrates an embodiment of an interface showing a display of changes to a case entry 204 in a case database 203. The interface of FIG. 19 includes a form display area 1920 and a change display area 1908 that correspond to the form display area 1104 and change display area 1106 of FIG. 11 discussed above. The form display area 1920 includes regions 1902 of a case data entry form which have been collapsed for convenience of display; clicking on or selecting regions 1902 causes them to expand and display the form fields contained within as illustrated by expanded region 1904. Expanded region 1904 may be scrolled for convenient viewing using scroll bar 1906. Change display area 1908 includes element 1916 (corresponding to element 1110 in FIG. 11) displaying information about a change that was previously made to case entry 204. Selection of change display element 1916 (as indicated by its highlighting 1910) causes the interface to generate graphical indicator 1912 (corresponding to graphical indicator 1112) that visually links selected change display element 1916 with the form element 1912 corresponding to the case parameter that was altered by the change identified in element 1916.

Figure 20:
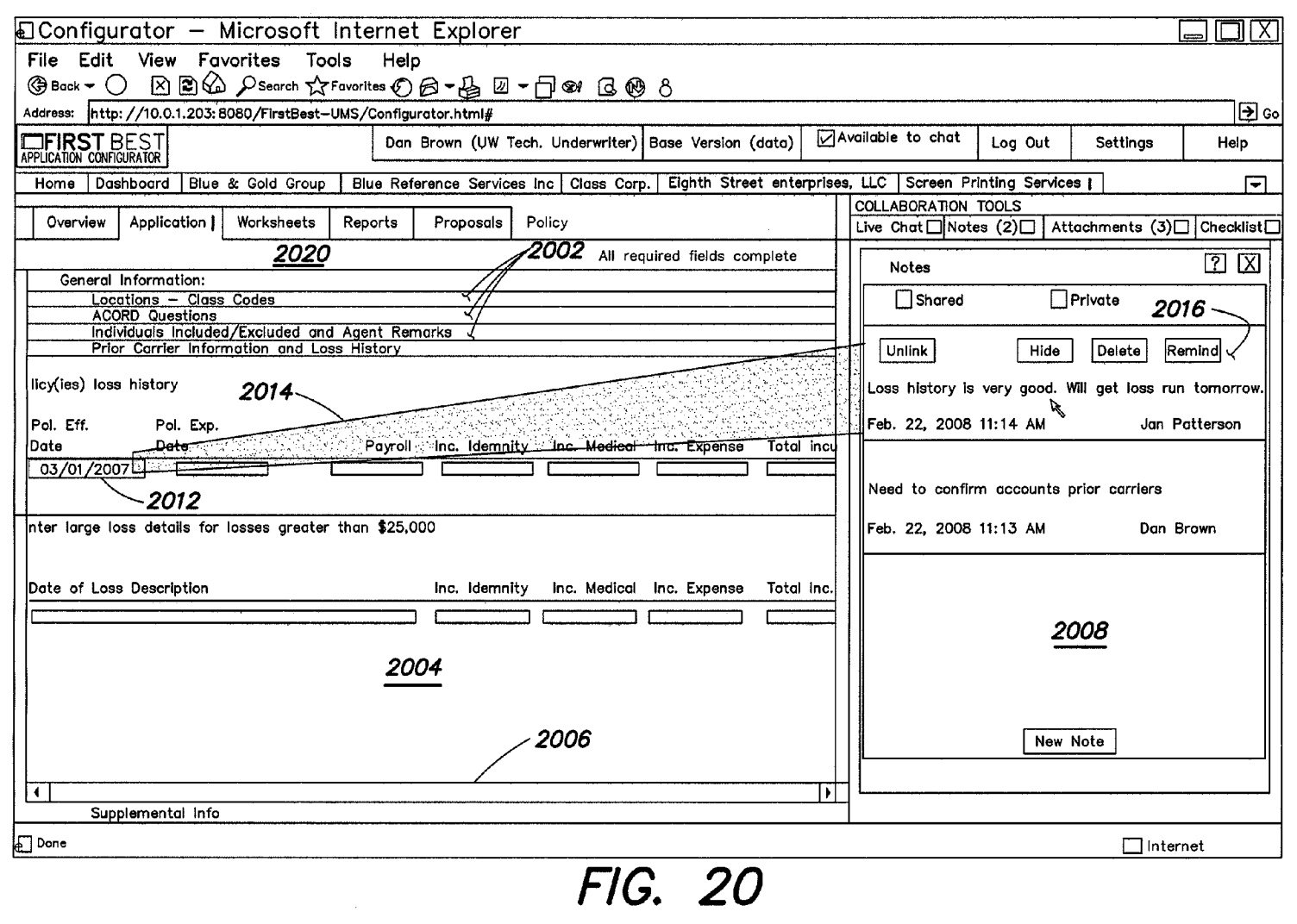

FIG. 20 is similar to FIG. 19, and illustrates an embodiment of an interface showing a display of annotations to a case entry 204 in a case database 203. The interface of FIG. 20 includes a form display area 2020 and an annotation display area 2008 that correspond to the form display area 1104 and change display area 1106 of FIG. 11 discussed above. The form display area 2020 includes regions 2002 of a case data entry form which have been collapsed for convenience of display; clicking on or selecting regions 2002 causes them to expand and display the form fields contained within as illustrated by expanded region 2004. Expanded region 2004 may be scrolled for convenient viewing using scroll bar 2006. Annotation display area 2008 includes element 2014 (corresponding to element 1110 in FIG. 11) displaying information about an annotation that was previously made to case entry 204. Selection of annotation element 2016 causes the interface to generate graphical indicator 2016 (corresponding to graphical indicator 1112) that visually links selected annotation element 2012 with the form element 2012 corresponding to the case parameter that is annotated by the annotation identified in annotation element 2016.

Figure 21:
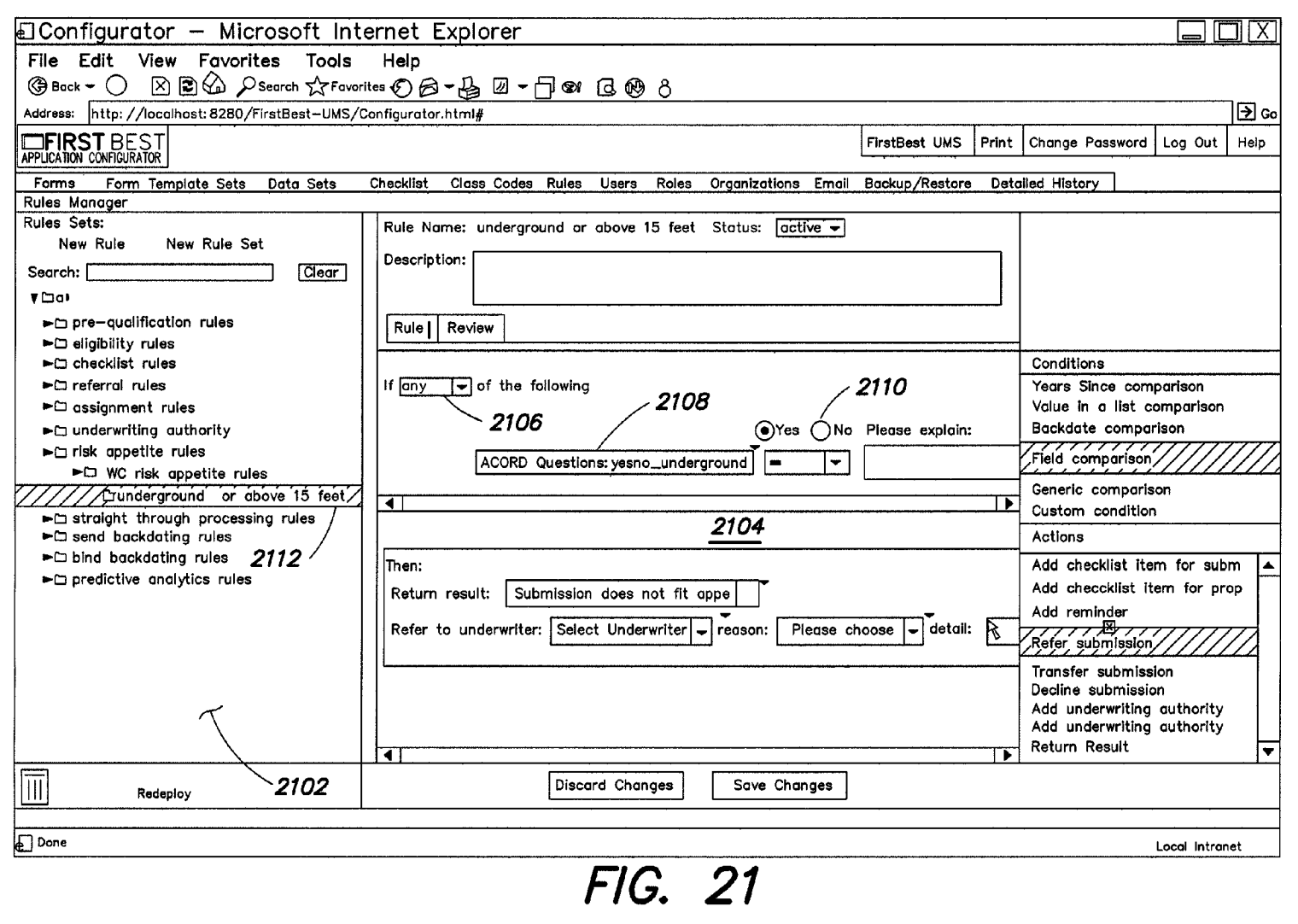

FIG. 21 illustrates an embodiment of an interface for creating or altering business rules in the business rule database 205. The interface of FIG. 21 may be operated by a managing user or other user with authority to create and alter the definitions of business rules in the business rule database 205. The interface of FIG. 15, which is implemented in a web browser, includes a browsable list 2102 of the business rules in the database. Selection of a business rule 2112 from the browsable list opens business rule display 2104 in which the conditional parameters of the business rule 2112 are displayed in an editable form. The editable form includes drop down menus 2106 and 2108, radio buttons 2110, and other input fields for defining the logical operation of the business rule.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of processing and managing the underwriting of an insurance contract, the method comprising:
   receiving, from a terminal operated by an underwriter registered in a user database comprising a plurality of user entries, a request for approval of the insurance contract, the request for approval of the insurance contract including a plurality of underwriting parameters of the insurance contract;
   reading, from a user entry in the user database corresponding to the registered underwriter, a plurality of underwriting criteria corresponding to the registered underwriter;
   determining, using a computer program, whether the underwriting parameters of the insurance contract satisfy the underwriting criteria corresponding to the registered underwriter;
   providing, to the terminal, an interface including a status message indicating that at least one underwriting criterion is not satisfied, if at least one underwriting criterion is not satisfied;
   providing an underwriting failure message to a managing underwriter identified in the user entry corresponding to the registered underwriter, if at least one parameter of the insurance contract does not satisfy the underwriting criteria in the user entry corresponding to the one of the plurality of registered underwriters;
   reading, from a user entry in the user database corresponding to the managing underwriter, a plurality of underwriting criteria corresponding to the managing underwriter;
   determining whether the underwriting parameters of the insurance contract satisfy the underwriting criteria corresponding to the managing underwriter; and
   providing a status message to the managing underwriter indicating that at least one underwriting criterion corresponding to the managing underwriter is not satisfied, if at least one underwriting criterion corresponding to the managing underwriter is not satisfied.

2. The method of claim 1, wherein the interface comprises a parameter display area for displaying the parameters of the insurance contract and a status display area for displaying the status message.

3. The method of claim 2, wherein the status display area includes an element corresponding to the at least one parameter of the insurance contract that does not satisfy the underwriting criteria in the user entry corresponding to the one of the plurality of registered underwriters.

4. The method of claim 3, wherein the interface further comprises a graphical element linking the element of the status display area with an element of the parameter display area corresponding to the at least one parameter of the insurance contract.

5. The method of claim 4, wherein the graphical element is created in response to input from the one of the plurality of registered underwriters.

6. The method of claim 5, wherein the input includes a selection of the element of the status display area.

7. The method of claim 5, wherein the input includes a selection of the element of the parameter display area.

8. The method of claim 5, wherein the input includes hovering a cursor over the element of the status display area.

9. The method of claim 5, wherein the input includes hovering a cursor over the element of the parameter display area.

10. The method of claim 4, wherein the graphical element includes an indicia of a reason for which the at least one parameter of the insurance contract does not satisfy the underwriting criteria in the user entry corresponding to the one of the plurality of registered underwriters.

11. The method of claim 10, wherein the indicia includes a color.

12. The method of claim 10, wherein the indicia includes a texture.

13. The method of claim 10, wherein the graphical element includes a shape which is computed based upon a size and location of the element of the status display area and a size and location of the element of the parameter display area.

14. The method of claim 1, wherein the underwriting failure message identifies the at least one parameter of the insurance contract that does not satisfy the underwriting criteria.

15. The method of claim 1, wherein providing the underwriting failure message comprises providing the underwriting failure message to an interface operated by the managing underwriter.

16. The method of claim 15, wherein the interface operated by the managing underwriter comprises a parameter display area for displaying the parameters of the insurance contract and a status display area for displaying the underwriting failure message.

17. The method of claim 16, wherein the status display area includes an element corresponding to the at least one parameter of the insurance contract that does not satisfy the underwriting criteria in the user entry corresponding to the one of the plurality of registered underwriters.

18. The method of claim 17, wherein the interface operated by the managing underwriter further comprises a graphical element linking the element of the status display area with an element of the parameter display area corresponding to the at least one parameter of the insurance contract.

19. The method of claim 18, wherein the graphical element is created in response to input from the managing underwriter.

20. The method of claim 19, wherein the input includes a selection of the element of the status display area.

21. The method of claim 19, wherein the input includes a selection of the element of the parameter display area.

22. The method of claim 19, wherein the input includes hovering a cursor over the element of the status display area.

23. The method of claim 19, wherein the input includes hovering a cursor over the element of the parameter display area.

24. The method of claim 18, wherein the graphical element includes an indicia of a reason for which the at least parameter of the insurance contract does not satisfy the underwriting criteria in the user entry corresponding to the one of the plurality of registered underwriters.

25. The method of claim 24, wherein the indicia includes a color.

26. The method of claim 24, wherein the indicia includes a texture.

27. The method of claim 24, wherein the graphical element includes a shape which is computed based upon a size and location of the element of the status display area and a size and location of the element of the parameter display area.

28. The method of claim 1, wherein providing the underwriting failure message comprises receiving an instruction from the interface operated by the registered underwriter and providing the underwriting failure message in response to receiving the instruction.

29. The method of claim 1, further comprising:
providing an underwriting failure message to a second managing underwriter identified in the user entry corresponding to the managing underwriter, the second managing underwriter having a higher level of underwriting authority than the managing underwriter, if the parameters of the insurance contract do not satisfy the underwriting criteria corresponding to the managing underwriter.

30. The method of claim 29, wherein providing the underwriting failure message comprises providing the underwriting failure message to an interface operated by the second managing underwriter.

31. The method of claim 1, wherein each of the underwriting criteria corresponding to the registered underwriter is based upon one of more business rules.

32. The method of claim 31, wherein each of the underwriting parameters of the insurance contract is based upon one or more of the business rules.

33. The method of claim 32, further comprising:
providing, to the interface operated by the registered underwriter, a web page including a form for entering the underwriting parameters of the insurance contract, wherein the form is based upon the one or more business rules.

34. The method of claim 32, further comprising:
receiving, from the interface operated by the registered underwriter, an instruction including a description of one or more of the business rules;
defining one or more of the business rules according to the received instruction.

35. The method of claim 34, further comprising:
providing, to the interface operated by the registered underwriter, a web page including a form for entering the underwriting parameters of the insurance contract, wherein the form is based upon the one or more business rules.

36. The method of claim 35, wherein providing the web page further comprises generating the web page dynamically in response to an input received from the interface operated by the registered underwriter.

37. The method of claim 35, wherein the form includes at least one field that is displayed only if an entry in a previous field satisfies a predetermined criterion.

38. The method of claim 1, wherein the user entry in the user database corresponding to the registered underwriter includes a user class of the registered underwriter, and wherein the method further comprises:
generating the interface operated by the registered underwriter based, at least in part, upon the user class of the registered underwriter.

39. The method of claim 1, further comprising:
storing the plurality of underwriting parameters in a case entry in a case database.

40. The method of claim 39, wherein the case database is the same database as the user database.

41. The method of claim 39, further comprising:
receiving, from an interface operated by a second registered underwriter in the user database, at least one change to the case entry.

42. The method of claim 41, wherein receiving the at least one change to the case entry further comprises receiving the at least one change to the case entry before the insurance contract is bound.

43. The method of claim 41, wherein receiving the at least one change to the case entry further comprises receiving the at least one change to the case entry after the insurance contract is bound but before the insurance contract is issued.

44. The method of claim 41, wherein receiving the at least one change to the case entry further comprises receiving the at least one change to the case entry after the insurance contract is issued.

45. The method of claim 41, wherein the at least one change to the case entry comprises at least one change to one of the underwriting parameters of the insurance contract.

46. The method of claim 41, wherein the at least one change to the case entry comprises at least one annotation to the case entry.

47. The method of claim 41, further comprising:
generating a user interface comprising a parameter display area for displaying the parameters of the insurance contract and a change display area for displaying the at least one change to the case entry made by the second registered underwriter.

48. The method of claim 47, further comprising:
displaying the user interface to a third registered underwriter, the third registered underwriter being a different underwriter from the registered underwriter, the second registered underwriter, or both.

49. The method of claim 48, wherein the change display area includes an element corresponding to the at least one change to the case entry made by the second registered underwriter.

50. The method of claim 49, wherein the change to the case entry relates to a parameter of the insurance contract; and wherein the interface further comprises a graphical element linking the element of the change display area with an element of the parameter display area corresponding to the parameter of the insurance contract to which the change relates.

51. The method of claim 50, further comprising:
generating the graphical element in response to an input received from the third registered underwriter.

52. The method of claim 51, wherein the input from the third registered underwriter includes a selection of the element of the change display area.

53. The method of claim 51, wherein the input from the third registered underwriter includes a selection of the element of the parameter display area.

54. The method of claim 51, wherein the input from the third of the plurality of registered underwriters includes hovering a cursor over the element of the change display area.

55. The method of claim 51, wherein the input from the third of the plurality of registered underwriters includes hovering a cursor over the element of the parameter display area.

56. The method of claim 50, wherein the graphical element includes an indicia of the nature of the at least one change to the case entry.

57. The method of claim 56, wherein the indicia includes a color.

58. The method of claim 56, wherein the indicia includes a texture.

59. The method of claim 50, wherein the graphical element includes a shape which is computed based upon a size and location of the element of the change display area and a size and location of the of the element of the parameter display area.

60. The method of claim 1, further comprising:
   providing data readable by a printer to generate a printed letter of authority for the registered underwriter.

* * * * *